(12) United States Patent
Jin et al.

(10) Patent No.: US 10,803,121 B2
(45) Date of Patent: Oct. 13, 2020

(54) SYSTEM AND METHOD FOR REAL-TIME GRAPH-BASED RECOMMENDATIONS

(71) Applicants: GraphSQL, Inc., Mountain View, CA (US); Kent State University, Kent, OH (US)

(72) Inventors: Ruoming Jin, Kent, OH (US); Adam Anthony, Kent, OH (US); Ming Lin, Great Neck, NY (US); Nicholas Tietz, Kent, OH (US)

(73) Assignees: GraphSQL, Inc., Redwood City, CA (US); Kent State University, Kent, OH (US)

( * ) Notice: Subject to any disclaimer, the term of this patent is extended or adjusted under 35 U.S.C. 154(b) by 802 days.

(21) Appl. No.: 15/167,992

(22) Filed: May 28, 2016

(65) Prior Publication Data
US 2016/0350662 A1 Dec. 1, 2016

Related U.S. Application Data

(60) Provisional application No. 62/167,785, filed on May 28, 2015.

(51) Int. Cl.
*G06F 16/901* (2019.01)
*G06F 16/245* (2019.01)
(Continued)

(52) U.S. Cl.
CPC ........ *G06F 16/9024* (2019.01); *G06F 16/245* (2019.01); *G06F 16/28* (2019.01); *G06N 5/022* (2013.01)

(58) Field of Classification Search
CPC .... G06F 16/9024; G06F 16/245; G06F 16/28; G06N 5/022
See application file for complete search history.

(56) References Cited

U.S. PATENT DOCUMENTS

| 10,657,161 B2 * | 5/2020 | Zeng | G06F 16/3322 |
| 2008/0033914 A1 * | 2/2008 | Cherniack | G06F 16/24544 |

(Continued)

OTHER PUBLICATIONS

Lai et al, Scalable Distributed Subgraph Enumeration, 2016, Proceedings of the VLDB Endowment, vol. 10, No. 3 (Year: 2016).*

(Continued)

*Primary Examiner* — Austin Hicks
(74) *Attorney, Agent, or Firm* — Orrick, Herrington & Sutcliffe LLP

(57) ABSTRACT

Systems and methods for generating real-time, personalized recommendations are disclosed. In one embodiment, a method operates upon an electronic data collection organized as a network of vertices and edge connections between the vertices. The method provides the recommendations includes iteratively traversing across edges that satisfy search criteria to a new set of vertices and filtering each new set of vertices to satisfy the search criteria. At the conclusion of the traversing and filtering, a final set of vertices represents the recommended entities. In some embodiments, a control vector describes a sequence of relationships between a requester and the items to be recommended. The method can assign scores to candidate recommendations and select the recommendations having the highest scores. Advantageously, the method provides flexibility and rapid execution of recommendation queries without the need to precompute intermediate results.

17 Claims, 16 Drawing Sheets

(51) Int. Cl.
    *G06F 16/28*      (2019.01)
    *G06N 5/02*       (2006.01)

(56)                 References Cited

U.S. PATENT DOCUMENTS

| | | |
|---|---|---|
| 2009/0112989 A1 | 4/2009 | Anderson et al. |
| 2010/0161651 A1 | 6/2010 | Cras |
| 2013/0246439 A1 | 9/2013 | Liekens et al. |
| 2014/0172914 A1* | 6/2014 | Elnikety ............. G06F 16/9024 707/774 |
| 2014/0280224 A1 | 9/2014 | Feinberg et al. |
| 2014/0317038 A1* | 10/2014 | Mojsilovic ............... G06N 5/02 706/46 |
| 2015/0120432 A1 | 4/2015 | Wang et al. |

OTHER PUBLICATIONS

WO, International Search Report, International Application No. PCT/US2016/034894, dated Sep. 8, 2016.

\* cited by examiner

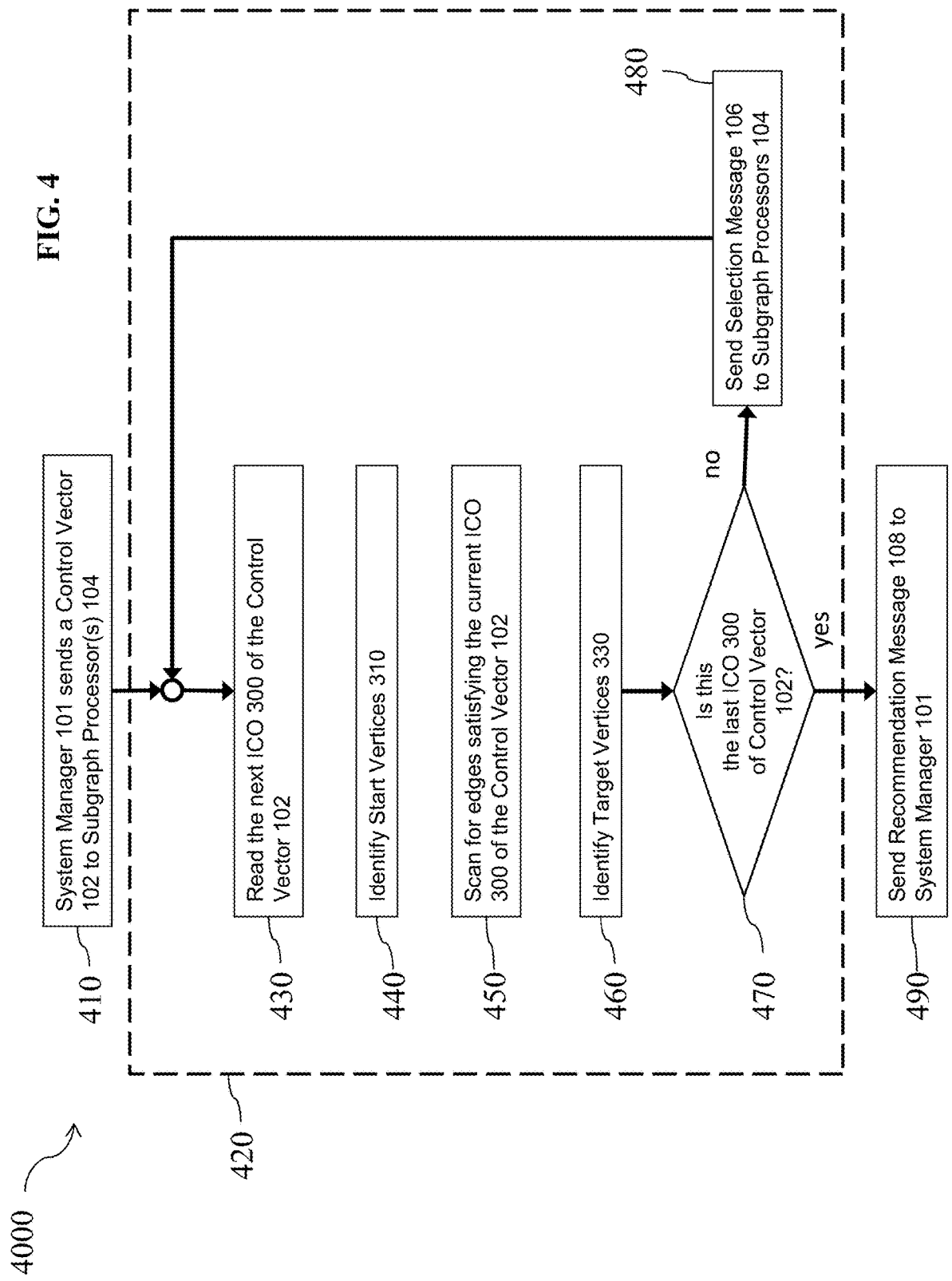

| Vertex ID | Vertex Type | Other attributes (optional) |
|---|---|---|
| P1 | Person | Ann |
| P2 | Person | Bea |
| P3 | Person | Cal |
| A1 | Activity | Chicago Cubs |
| A2 | Activity | Field Museum |
| A3 | Activity | Chicago White Sox |
| A4 | Activity | Universal Theme Park |
| L1 | Location | Chicago |
| T1 | Tag | Sports |
| T2 | Tag | Dinosaurs |

510  520  530

| Source vertex ID 610 | Target vertex ID 620 | Edge type 630 | Weight (optional) 640 | Time (optional) 650 | Other attributes (optional) 660 |
|---|---|---|---|---|---|
| P1 | A1 | Did | | 7/1/15 | $30 |
| P1 | A2 | Did | 2 | 7/4/15 | $15 |
| P1 | P2 | Friend | | 9/22/07 | |
| P2 | A2 | Did | 0.4 | 12/15/14 | $15 |
| P2 | A3 | Did | | 7/8/15 | $25 |
| P3 | A2 | Did | 0.8 | 9/13/15 | $18 |
| P3 | A4 | Did | | 7/1/15 | $50 |
| A1 | L1 | At | 1 | Null | $45 |
| A1 | T1 | Is_a | 1 | Null | |
| A2 | L1 | At | 1 | Null | |
| A2 | T2 | Has | 1 | Null | |
| A3 | L1 | At | 1 | Null | |
| A3 | T1 | Is_a | 1 | Null | |
| A4 | T2 | Has | 1 | Null | |

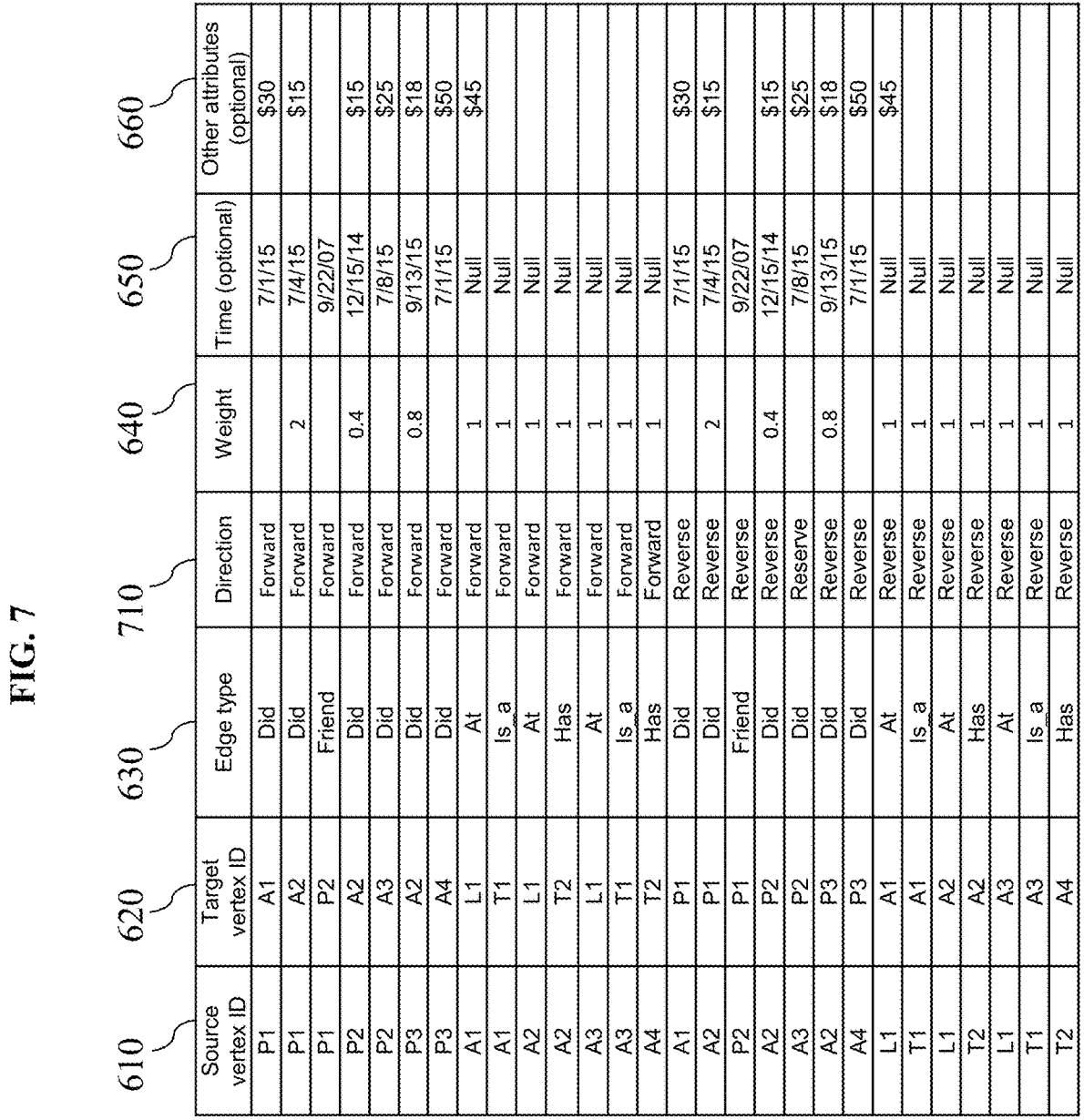

| Source vertex ID | Target vertex ID | Edge type | Direction | Weight | Time (optional) | Other attributes (optional) |
|---|---|---|---|---|---|---|
| P1 | A1 | Did | Forward | | 7/1/15 | $30 |
| P1 | A2 | Did | Forward | 2 | 7/4/15 | $15 |
| P1 | P2 | Friend | Forward | | 9/22/07 | |
| P2 | A2 | Did | Forward | 0.4 | 12/15/14 | $15 |
| P2 | A3 | Did | Forward | | 7/8/15 | $25 |
| P3 | A2 | Did | Forward | 0.8 | 9/13/15 | $18 |
| P3 | A4 | Did | Forward | | 7/1/15 | $50 |
| A1 | L1 | At | Forward | 1 | Null | $45 |
| A1 | T1 | Is_a | Forward | 1 | Null | |
| A2 | L1 | At | Forward | 1 | Null | |
| A2 | T2 | Has | Forward | 1 | Null | |
| A3 | L1 | At | Forward | 1 | Null | |
| A3 | T1 | Is_a | Forward | 1 | Null | |
| A4 | T2 | Has | Forward | 1 | Null | |
| A1 | P1 | Did | Reverse | | 7/1/15 | $30 |
| A2 | P1 | Did | Reverse | 2 | 7/4/15 | $15 |
| P2 | P1 | Friend | Reverse | | 9/22/07 | |
| A2 | P2 | Did | Reverse | 0.4 | 12/15/14 | $15 |
| A3 | P2 | Did | Reverse | | 7/8/15 | $25 |
| A2 | P3 | Did | Reverse | 0.8 | 9/13/15 | $18 |
| A4 | P3 | Did | Reverse | | 7/1/15 | $50 |
| L1 | A1 | At | Reverse | 1 | Null | $45 |
| T1 | A1 | Is_a | Reverse | 1 | Null | |
| L1 | A2 | At | Reverse | 1 | Null | |
| T2 | A2 | Has | Reverse | 1 | Null | |
| L1 | A3 | At | Reverse | 1 | Null | |
| T1 | A3 | Is_a | Reverse | 1 | Null | |
| T2 | A4 | Has | Reverse | 1 | Null | |

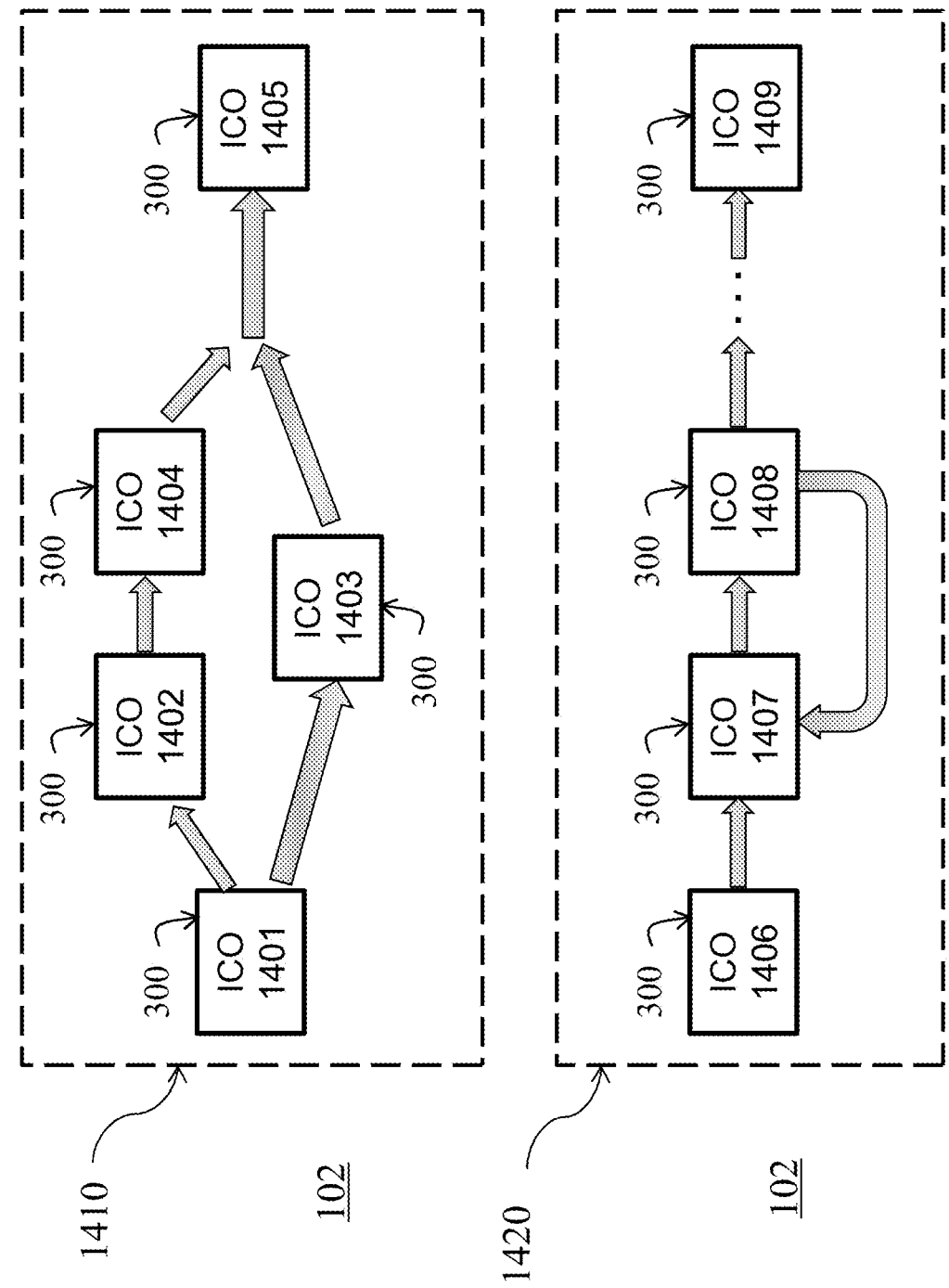

SYSTEM AND METHOD FOR REAL-TIME GRAPH-BASED RECOMMENDATIONS

CROSS-REFERENCE TO RELATED APPLICATIONS

This application claims priority to U.S. provisional patent application, Ser. No. 62/167,785, filed May 28, 2015. Priority to the provisional patent application is expressly claimed, and the disclosure of the provisional application is hereby incorporated herein by reference in its entirety and for all purposes.

FIELD

The disclosed embodiments relate generally to graph-based relationships and more specifically, but not exclusively, to graph-based personalized recommendations.

BACKGROUND

Many types of data analysis on large data sets call for, or would benefit from, a graph-oriented analysis. A graph is a data structure comprising a collection of data objects called vertices and a collection of vertex-to-vertex connections called edges. Data in which objects have relationships with other objects are naturally analyzed in graph format.

One important type of data analysis on a graph is recommendation search. A recommendation search examines the vertex objects and relationships in the graph and selects those vertex objects that best satisfy criteria of the search. In a graph-based recommendation, the search criteria describe not only the desired objects but also the relationship between the desired objects and a given set of seed vertices.

Conventional recommendation systems are designed to support only one fixed type of relationship between a requestor and recommended items. For example, in a collaborative filtering recommendation system, a standard relationship is "Find items that are liked by persons who like many of the same things that I like." This criterion can be expressed as a chain of relationships: (Person)→Like(Item) →(other Person)→Like(other item). A typical system performs a global computation of all the weighted relationships between all users and all products. A global computation is very expensive; such systems are often optimized to perform just this one single relationship pattern.

In view of the foregoing, a need exists for an improved system for real-time graph-based recommendations in an effort to overcome the aforementioned obstacles and deficiencies of conventional recommendation systems.

BRIEF DESCRIPTION OF THE DRAWINGS

FIG. 4 is an exemplary flow chart illustrating one embodiment of a real-time recommendation method implemented by the graph-based recommendation system of FIG. 1.

FIG. 5 is an exemplary diagram illustrating an embodiment of a vertex table of the graph database of FIG. 1.

FIG. 7 is exemplary diagram illustrating another embodiment of the edge table of FIG. 1.

FIG. 14 is an exemplary block diagram illustrating non-linear embodiments of the control vector of FIG. 3A.

Figure 1:
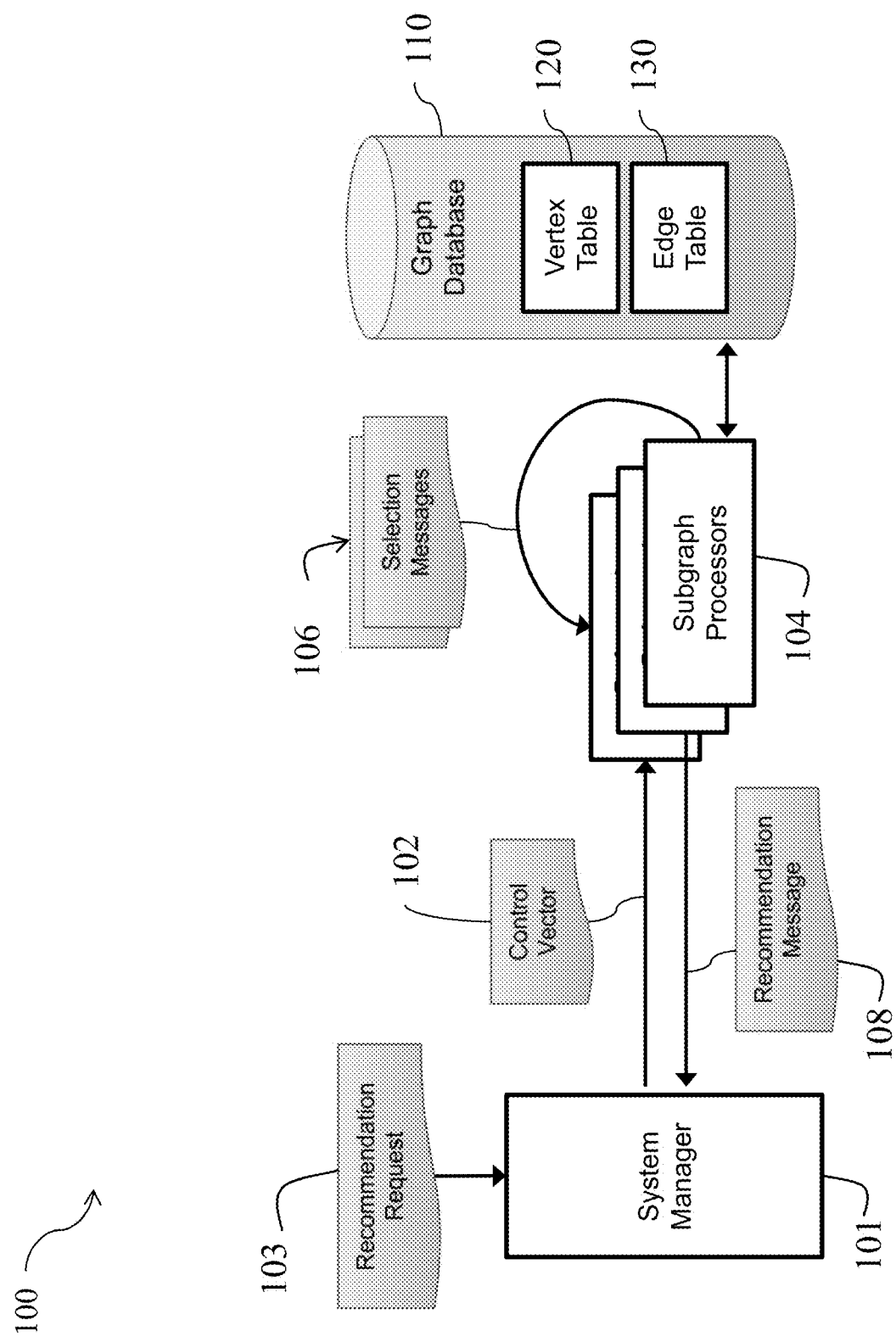
FIG. 1 is an exemplary top-level block diagram illustrating one embodiment of a graph-based recommendation system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available recommendation systems are deficient because they can only perform a limited range of recommendations, a system for real-time graph-based analysis can prove desirable and provide a basis for a wide range of graph computation applications, such as providing global, dynamic recommendations. This result can be achieved, according to one embodiment disclosed herein, by a recommendation system 100 for distributed graph computation as illustrated in FIG. 1.

Compared to conventional recommendation systems, the recommendation system 100 advantageously is not limited to a predefined relationship pattern. Instead, the recommendation system 100 can use a control vector as an input parameter that describes the relationship pattern. The control vector steers the generation of personalized recommendations instead of global recommendations, starting from one or several origin vertices and then proceeding to those target vertices that have the designated relationship to a previous vertex.

Another advantage of the recommendation system 100 is that it does not require any precomputed data or data index derived from the graph structure. This freedom advantageously allows the graph to be updated, whenever the underlying data changes, with no overhead for additional computations.

Turning to FIG. 1, the recommendation system 100 includes a System Manager 101 in communication with one or more Subgraph Processors 104, and a Graph Database 110. The Subgraph Processors 104 are operatively coupled to the Graph Database 110. Although not shown, each Subgraph Processor 104 can contain a full or partial copy of the Graph Database 110, such that each data record of the Graph Database 110 is stored in at least one Subgraph Processor 110. In this embodiment, each vertex record or edge record that is stored in a selected Subgraph Processor 110 can be assigned to the selected Subgraph Processor 110. The Graph Database 110 maintains the data that the recommendation system 100 analyzes and transforms to produce recommendations.

In some embodiments, the System Manager 101 is a programmable computational device, such as a computer or microprocessor, for handling the system's management tasks. Each Subgraph Processor 104 can be a programmable computational device. In some embodiments, each Subgraph Processor 104 may be a physically distinct computational unit, such as a computer or a microprocessor, or a virtual processor constructed in software, within a larger computational device.

To respond to a recommendation request 103, the System Manager 101 can translate the recommendation request 103 into a Control Vector 102 and sends the Control Vector 102 to one or more selected Subgraph Processors 104. The Control Vector 102 instructs the Subgraph Processors 104 to perform an iterative sequence of vertex-to-connected-vertex selections. Once per iteration, each selected Subgraph Processor 104 can issue one or more Selection Messages 106 to other Subgraph Processors 104 identifying vertices selected for the next iteration. The vertices that the Subgraph Processors 104 select in the final iteration represent the recommended items. After the final iteration, the Subgraph Processors 104 collectively forward Recommendation Messages 108 to the System Manager 101.

The Control Vector 102, the Selection Messages 106, and the Recommendation Messages 108 can include electronic data packets sent between the System Manager 101 and the Subgraph Processors 104. Any of the components in the system may be replicated, to increase reliability or performance, for example, in the event of component failure or slowdown.

Figure 2A:
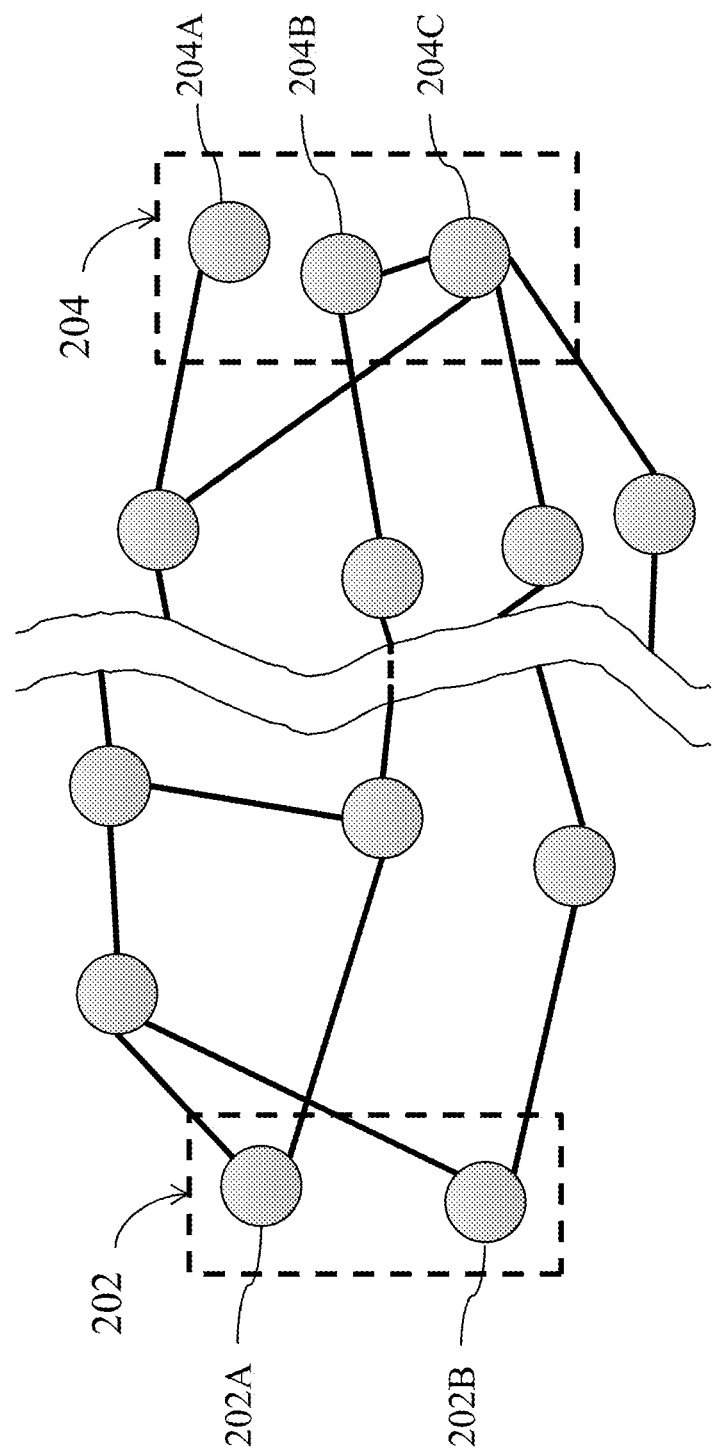
FIG. 2A is an exemplary diagram illustrating one embodiment of a relationship graph used by the graph-based recommendation system of FIG. 1.

Turning to FIG. 2A, the recommendation system 100 analyzes a relationship graph 200. The relationship graph 200 includes a set of vertices and a set of edges, where an edge is a connection between two vertices. The two vertices which an edge connects are called its Source vertex and Target vertex. Each vertex of the relationship graph 200 can represent any discrete entity or discrete concept—such as a person, a product, an action, an event, or an attribute.

An edge represents a relationship between two entities. Two vertices may have multiple edges between them because there may be multiple relationships between two entities. Edges can be homogeneous—connecting vertices of the same type (e.g., such as Person-Person)—or heterogeneous—connecting two different types of vertices (e.g., such as Person-Product).

Starting from one or more designated vertices—called Seed vertices 202—and predetermined selection criteria, the recommendation system 100 selects one or more vertices—called Recommended vertices 204—that are the best fit for the predetermined selection criteria. The predetermined selection criteria can be in the form of a sequence of relationships and constraints between the Seed vertices 202 and the Recommended vertices 204. Such a sequence of relationships can correspond to a chain of connected edges from a selected Seed vertex 202 to a selected set of Recommended vertices 204.

Figure 2B:
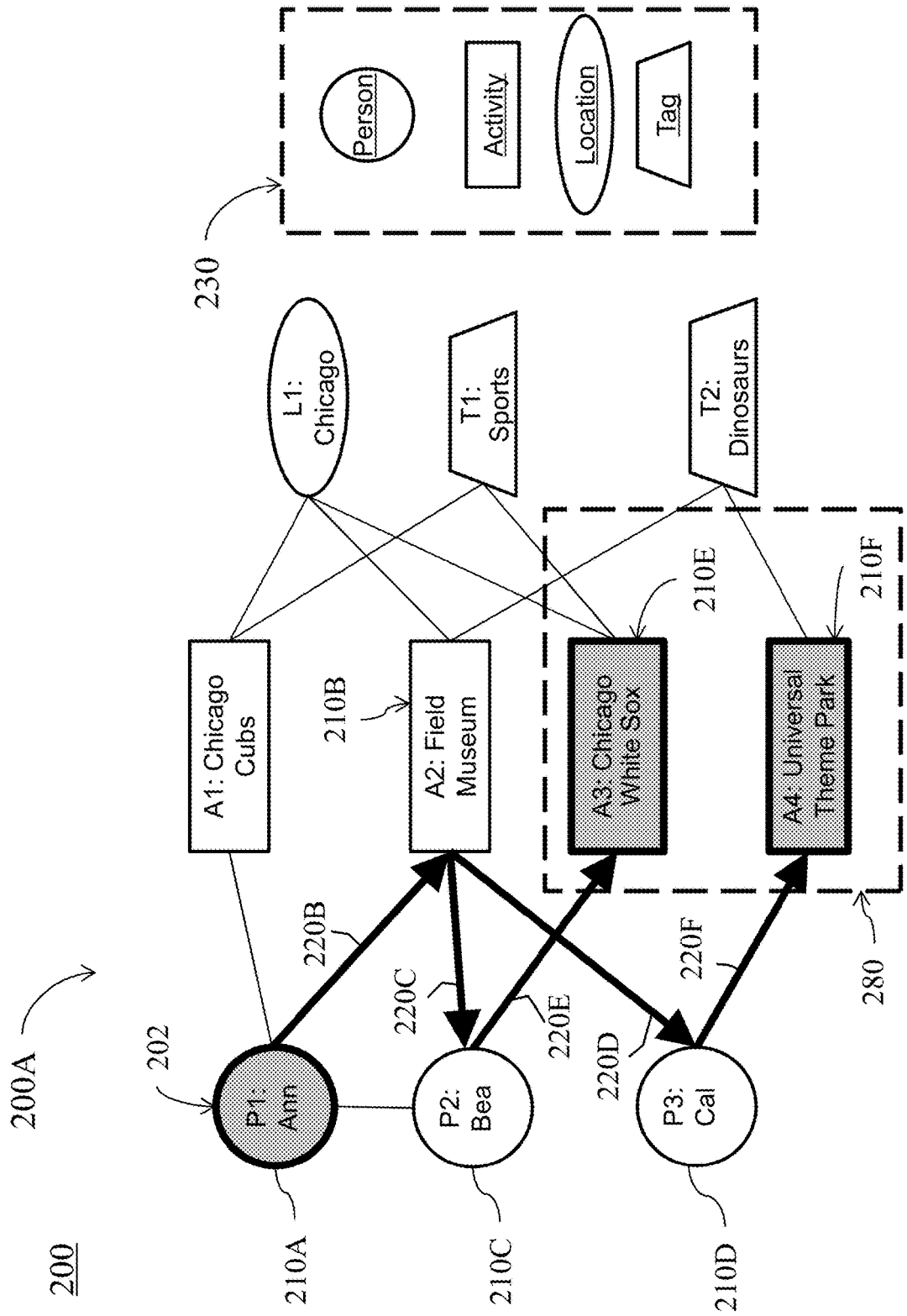
FIG. 2B is an exemplary diagram illustrating another embodiment of a relationship graph used by the graph-based recommendation system of FIG. 1.

Each vertex can have a type property that indicates the entity's type. The relationship graph 200 may contain more than one type of vertex, that is, vertices with different values of their type property. Turning to FIG. 2B, a particular example of the relationship graph 200 is illustrated as an exemplary relationship graph 200A, which includes types of vertices. A legend 230 is shown in FIG. 2B for illustration only and describes the types of vertices found in the exemplary relationship graph 200A. For example, a circle represents a Person, a rectangle represents an Activity, an oval represents a Location, and a trapezoid represents a Tag.

The exemplary relationship graph 200A includes fourteen edges represented by the lines between the vertices. Edges can also have types. For example, an edge 220B can represent a "visited" type edge (e.g., Ann visited The Field Museum), while an edge 220E can represent a "likes" type edge (e.g., Bea likes the Chicago White Sox).

As used herein, the terms "Source" and "Target" refer to the two ends of an edge, whereas "Start" and "End" refer to the endpoints of a path, a chain of one or more edges (whether or not the path is a Recommendation path). The "Start" vertices that represent the beginning of a Recommendation path are also known as the Seed Vertices 202. Similarly, the "End" vertices that represent the end of the Recommendation path are known as the Recommended Vertices 204. While paths are constructed from edges, a path is semantically different than an edge.

Although there can be a semantic directionality to a relationship, the recommendation system can traverse a selected edge in either direction. Stated in another way, if there is a connection between vertices A and B, then not only is A aware of the connection to B and able to locate B, but also B is aware of the connection to A and can locate A.

The exemplary relationship graph 200A shows two examples of Recommendation paths, each one illustrated as a chain of heavy arrows. For example, the two Recommendation paths can be used to answer a recommendation request 103 that is in the form of a natural-language query: "Find additional activities or places that were visited by persons who visited educational attractions that Ann visited."

To answer this recommendation request 103, a vertex 210A (i.e., P1:Ann) is the Seed vertex 202 of both illustrated Recommendation paths. In this example, although the Seed vertex 202 includes a single vertex (i.e., 210A), the recommendation request 103 can yield more than one Seed vertex 202. The recommendation system 100 operates iteratively. In each iteration, the recommendation system 100 works from the ends of the current partially constructed Recommendation paths and seeks to extend each path by finding adjacent edges that satisfy the selection criteria. Each edge vertex may have more than one eligible adjacent edge, so the paths may branch out, increasing in number.

In this example, in a first iteration, the recommendation system 100 selects an edge 220B with a Target A2: Field-Museum (i.e., a vertex 210B). The A1: Chicago-Cubs vertex was not selected, because it did not satisfy the predetermined selection criteria of the Control Vector 102.

The vertex 210B then becomes the Source vertex for a second iteration. In the second iteration, two suitable edges emanate from the current Source vertex (i.e., the vertex 210B), so the recommendation system 100 selects two edges, an edge 220C having a Target P2:Bea (i.e., vertex 210C) and an edge 220D having a Target P3:Cal (i.e., vertex 210D). The recommendation system 100 now has created at least two unique paths. The two Target vertices become the Source vertices for the third iteration. In the third iteration, the Source vertex 210C leads to edge 220E and Target A3:Chicago White Sox (i.e., vertex 210E), while vertex 210D leads to edge 220F and Target A4:Universal Theme Park (i.e., vertex 210F). The third iteration is the last iteration, so the two Target vertices (i.e., vertex 210E and vertex 210F), are designated as the Recommended vertices 280.

As discussed by way of example, the recommendation system 100 identifies one or more Recommendation paths. A selected Recommendation path is a sequence of connected edges in the graph, starting at the Seed vertex 202, and which satisfy the predetermined selection criteria. The end of the selected Recommendation path is a selected Recommended vertex 204. The Recommended vertices 204 are the set of end vertices of all the Recommendation paths.

Therefore, the recommendation system 100 searches the network of possible connections, narrowing down the selection to those connections that satisfy the requested criteria.

Every recommendation is personalized because the result—that is, the Recommended vertices 204—depends on the choice of Seed vertices 202 as well as the selection criteria (e.g., characterized by the Control Vector 102).

Message Packets and Communication Between Components

The System Manager 101 and Subgraph Processors 104 communicate with one other to coordinate operations, sending instructions, status, and data, via electronic message packets. The recommendation system 100 can include three types of message packets: the Control Vectors 102, the Selection Messages 106, and the Recommendation Messages 108.

To initiate a recommendation process, the System Manager 101 sends the Control Vector 102 to one or more of the selected Subgraph Processors 104.

The recommendation system 100 executes an iterative flow. At the end of each iteration, with the possible exception of the last iteration, each Subgraph Processor 104 can distribute one or more Selection Messages 106 to the other Subgraph Processors 104.

At the end of the last iteration, the Subgraph Processors 104 that have identified final End vertices send a Recommendation Message 108 to the System Manager 101.

Control Vector 102

Figure 3A:
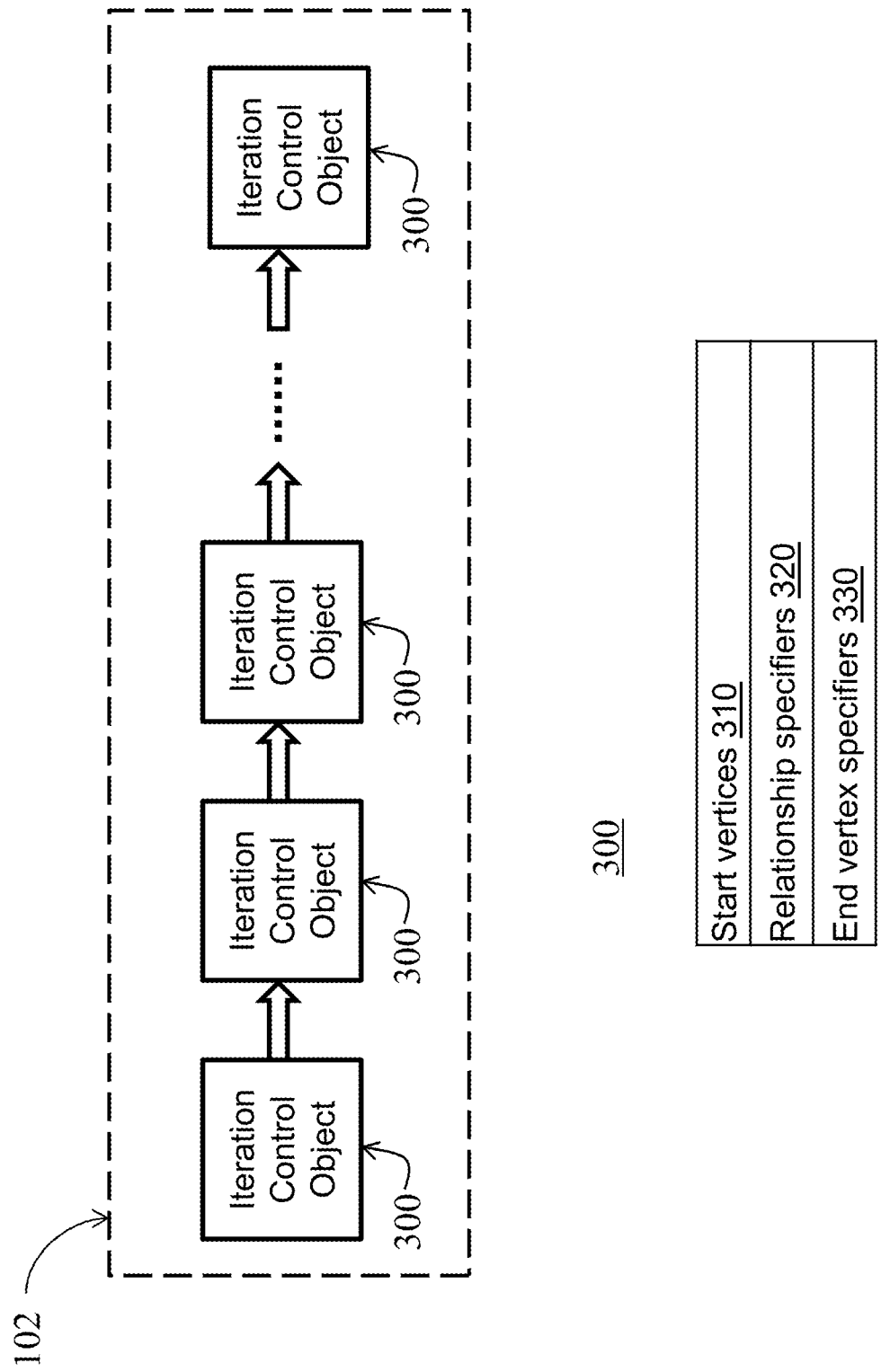
FIG. 3A is an exemplary block diagram illustrating one embodiment of a control vector used by the graph-based recommendation system of FIG. 1.

The Control Vector 102 guides the recommendation search by describing the desired relationship between the Seed Vertices 202 and the Recommended Vertices 204. Turning now to FIG. 3A, one embodiment of the Control Vector 102 is shown as a sequence of one or more Iteration Control Objects (ICOs) 300. Each ICO 300 can include a data structure that describes how a selected Subgraph Processor 104 should proceed from the current set of Start vertices to End vertices, progressively getting closer to the final set of recommended entities.

FIG. 3A also illustrates one embodiment of the ICO 300 having three data fields. A Start vertices field 310 identifies which vertices are to be the starting points for the current iteration. For example, the Start vertices field 310 can include vertex IDs (e.g., identifying individual vertices) or vertex types (e.g., identifying a group of one or more vertices). As another example, the Start vertices field 310 can include a reference code that indicates the current iteration should start from the End vertices of the previous iteration.

A second field—a Relationship specifiers field 320—indicates what type of vertex-vertex relationship is needed for a selected iteration. For example, the Relationship specifiers field 320 can include a list of edge types. In some embodiments, the Relationship specifiers field 320 can include edge type weights to describe the relative importance of different edge types. In some embodiments, it may contain starting and ending times, to limit the selected edges to only those that fall within a certain time range.

A third field—an End vertex specifiers field 330—can include conditional rules that restrict which vertices may be End vertices. The conditions can include conditional statements such as:

Comparisons: =, ?, <, >, ?, ?

Conjunction (AND), disjunction (OR), and inversion (NOT)

Set operations: IN, NOT IN

Satisfying ICO 300 Specifications

As described in the preceding paragraphs, each of the fields of the ICO 300 can include either a set of values or a set of conditional rules. When the Subgraph Processors 104 search for edges for a selected Recommendation path, the Subgraph Processors 104 compare the attributes of each edge against the values and conditional rules in the fields of the ICO 300. For example, if a field contains a conditional statement that is true for a selected edge, then the selected edge satisfies the conditional statement. In the case that a field contains a value, such as a Start vertex identifier or the name of an edge type, then the Subgraph Processor 104 checks each edge to see if the edge's values match the values in the field. If the values match, the edge matches the field of the ICO 300. Matching is a special case of satisfying, in which the implied conditional operation is equality (=).

The Subgraph Processors 104 may use pruning to reduce the number of conditional tests and matching tests that the Subgraph Processors 104 perform. That is, once an edge has failed any one of the required conditional tests or matching tests in the ICO 300, then the remaining tests do not need to be performed.

Setting the Control Vector 102

To submit a particular recommendation request 103 to the recommendation system 100, the fields of the ICOs 300, a collection of the ICOs 300 forming the Control Vector 102, are set to specific values. The values in the fields of the ICOs 300 of the Control Vector 102 provide the specific instructions to the recommendation system 100 for how to carry out a particular recommendation process. For example, suppose a goal of the recommendation request 103 is to find a refrigerator that is more than twenty cubic feet in size. The End vertex specifiers field 330 can include Vertex.Type=Product AND Product.Type=Refrigerator AND Refrigerator.size>20. All three conditions, for Vertex.Type, for Product.Type, and for Refrigerator.size, must be true for a given vertex in order for that vertex to satisfy the End vertex specifiers field 330.

For a more detailed example of how the recommendation system 100 assigns the values in the Control Vector 102, consider the recommendation query example presented previously in FIG. 2B: "Find additional activities or places that were visited by persons who visited educational attractions that Ann visited." The recommendation system 100 provides a way to convert a natural language query like this into a formal and unambiguous specification, the Control Vector 102.

Figure 3B:
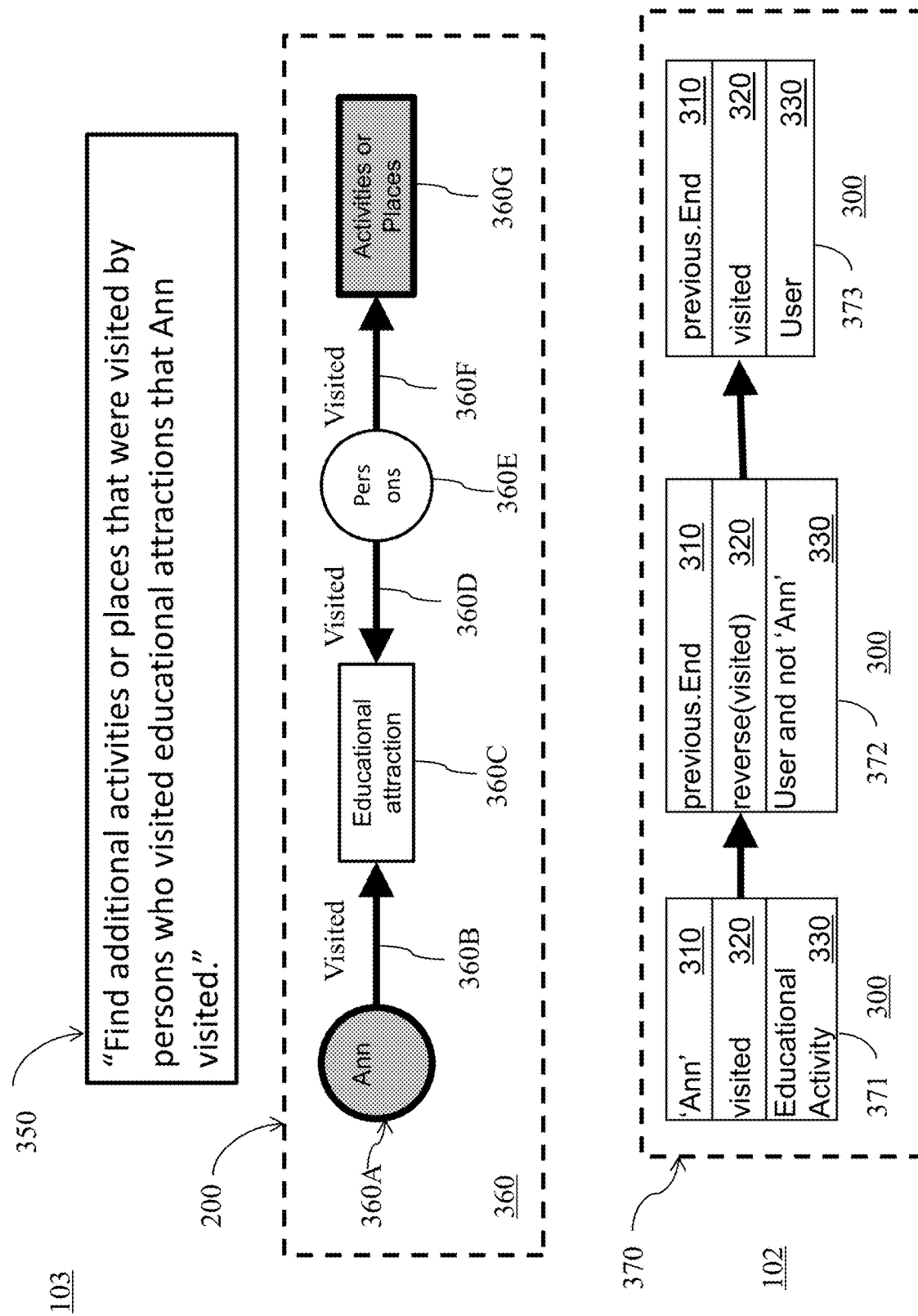
FIG. 3B is exemplary diagram illustrating the creation of a control vector by the graph-based recommendation system of FIG. 1.

Turning to FIG. 3B, a word-based query 350 is shown. A query graph 360 is semantically equivalent to the word-based query 350. Further, an input control vector 370, which is an example of the Control Vector 102, is semantically equivalent to the query graph 360. In some embodiments, the System Manager 101 can accept the recommendation request 103 in the form of the word-based query 350, the query graph 360, or the input control vector 370. The System Manager 101 includes a translation module (not shown) that can convert the word-based query 350 or the query graph 360 into the semantically-equivalent input control vector 370. One way to translate the word-based query 350 is to translate first to the query graph 360 and then translate to the input control vector 370. The translation module identifies the words in the word-based query 350 that map to vertex types, specific vertices, edge types, and other specifications. In this case, the syntax of the word-based query 350 flows in a direction opposite to that of the query graph 360. That is, the word-based query 350 begins with the desired result—"Additional activities or places"—and the ends with the Seed vertex—"Ann". The transition module identifies the verbs in the word-based query 350 that express relationships between entities. The entities may become vertices, and verbs may become edges. "Additional activities or places" becomes a result vertex set 360G at the end of the query graph 360, and "Ann" becomes a start vertex set 360A at the start of the query graph 360. "Ann" is related to "educational attractions" by a relationship "visited", so "educational attractions" becomes a vertex set 360C, connected to the vertex set 360A by a query edge 360B. "Persons who visited" results in a query edge 360D, which connects from a Users vertex set 360E to the vertex set 360C. Finally, "additional activities or places" is related to "Persons" by "that were visited by", so there is another query edge 360F connecting the Users vertex set 360E to the result vertex set 360G.

The System Manager 101 can convert the query graph 360 into the input control vector 370 as follows. Each edge of query graph 360, with its Source vertex and Target vertex, becomes an ICO 300 in the exemplary Control Vector 370. Specifically, the System Manager 101 translates the query edge 360B and endpoint vertices to an ICO 371 having the following fields: the Start vertices 310 containing 'Ann', the Relationship specifiers 320 containing "visited", and the End Vertex Specifiers 330 containing "Educational Attractions." The single quotation marks of 'Ann' indicate that Ann is a name of an individual vertex rather than of a vertex type. Similarly, the query edge 360D translates to an ICO 372 with the Start vertices 310 containing "previous.End", the Relationship specifiers containing "reverse(visited)", and the End Vertex Specifiers 330 containing "User and not 'Ann'." The value "previous.End" denotes the set of End vertices identified in the previous iteration. The value "reverse(visited)" specifies a "visited" edge type, except that the edge should be traversed from target to source. The reason for this reversal is the passive voice construct "were visited by" in the word-based query 350. The value "User and not 'Ann'" specifies User type vertices, but that the vertex named 'Ann' should be excluded. The query edge 360E—the third and final edge of query graph 360—translates to ICO 373. Just as query edges 360B, 360D, and 360F form a chain in query graph 360, the ICOs 371, 372, and 373 form an analogous chain.

Some embodiments of the ICO 300 include equivalent information that is structured differently than that shown in FIG. 3A. For example, some embodiments include additional specifiers that regulate additional search constraints or preferences.

Recommendation Process

The recommendation system 100 can analyze the relationship graph 200 in any suitable manner discussed above, such as a recommendation process 4000 for distributed graph computation as shown in FIG. 4. Turning to FIG. 4, the recommendation process 4000 for generating personalized recommendations begins when the System Manager 101 sends the Control Vector 102 to some or all of the Subgraph Processors 104, at step 410. The Control Vector 102 specifies what type of relationship edges and target vertices the Subgraph Processor 104 is to seek in each iteration.

The recommendation process 4000 proceeds to an iterative phase 420. In the iterative phase 420, each selected Subgraph Processors 104 iteratively performs a sequence of steps 430-480. All Subgraph Processors 104 begin each iteration of the iteration phase 420 in concert; however, the Subgraph Processors 104 are not required to execute the steps within iterative phase 420 in synchronicity. For example, all Subgraph Processors 104 start step 430 together but might not start step 440 together. Stated in another way, all Subgraph Processors 104 begin a subsequent iteration in parallel when a previous iteration has been completed for all Subgraph Processors 104.

The first step of iteration phase 420 is step 430. Each Subgraph Processor 104 reads and decodes the current ICO 300 of the Control Vector 102 for instructions, at 430. If the recommendation process 4000 is entering the first iteration of the iteration phase 420, then the current ICO 300 is defined to be the first ICO 300 in the Control Vector 102.

Following step 430, a selected Subgraph Processor 104 identifies which if any of its assigned vertices are identified in the Start Vertices field 310 for the current ICO 300, at step 440. After completing step 440, the selected Subgraph Processor 104 proceeds to step 450.

The selected Subgraph processor 104 searches its assigned edges and selects those edges whose Source vertices are identified in the Start Vertices field 310 and which also satisfy the conditions included in the Relationship specifiers field 320 of the current ICO 300, at step 450.

The selected Subgraph Processor 104 then proceeds to step 460, identifying the Target vertices of the edges selected in step 450. If a Target vertex satisfies any additional specifications in this iteration's segment of the Control Vector 102, then it is an End vertex.

Following step 460, the selected Subgraph Processor 104 proceeds to step 470. In step 470, if the current ICO 300 is an endpoint of the Control Vector 102, which means this iteration is the last iteration of recommendation process 4000, then the selected Subgraph Processor 104 sends a Recommendation Message 108 to the System Manager 101, at 490. The Recommendation Message 108 contains the set of End vertices identified in the current iteration's step 460. The Subgraph Processors 104 that have not identified any End vertices do not need to send a message.

If this iteration is not the last iteration, then each of the Subgraph Processors 104 sends a Selection Message 106 to the other Subgraph Processors 104, announcing the identity of its End vertices and that the one Subgraph Processor 104 is ready to start the next iteration, at 480. When all the Subgraph Processors 104 have completed step 480, the System Manager 101 instructs the Subgraph Processors 104 to start another iteration of iteration phase 420. If the Control Vector 102 is a simple directional chain, then the current ICO 300 for this next iteration is the ICO 300 directly following the current ICO 300. In other embodiments, the Control Vector 102 has a more complex structure (such as shown in FIG. 15), and can include instructions for how to proceed from one ICO 300 to the next ICO 300.

Vertex Tables, Edge Tables, and Subgraph Processors

The Graph Database 110 can store graph data in two tables—a Vertex Table 120 and an Edge Table 130. Moving to FIG. 5, an Example Vertex Table 500 is an example instance of the Vertex Table 120 (shown in FIG. 1). The Example Vertex Table 500 includes a collection of individual vertex records, each vertex record shown as a horizontal row of cells. Each vertex record comprises a Vertex ID 510, a Vertex Type 520, and Other attributes (optional) 530. The body of the Example Vertex Table 500 corresponds to the vertices for the exemplary relationship graph 200A of FIG. 2B. In this example, there is only one attribute in the Other attributes (optional) 530—a descriptive name for the vertex. However, in some embodiments, a vertex can have many additional attributes, and the kind of attributes may depend upon the type of vertex.

Figure 6:
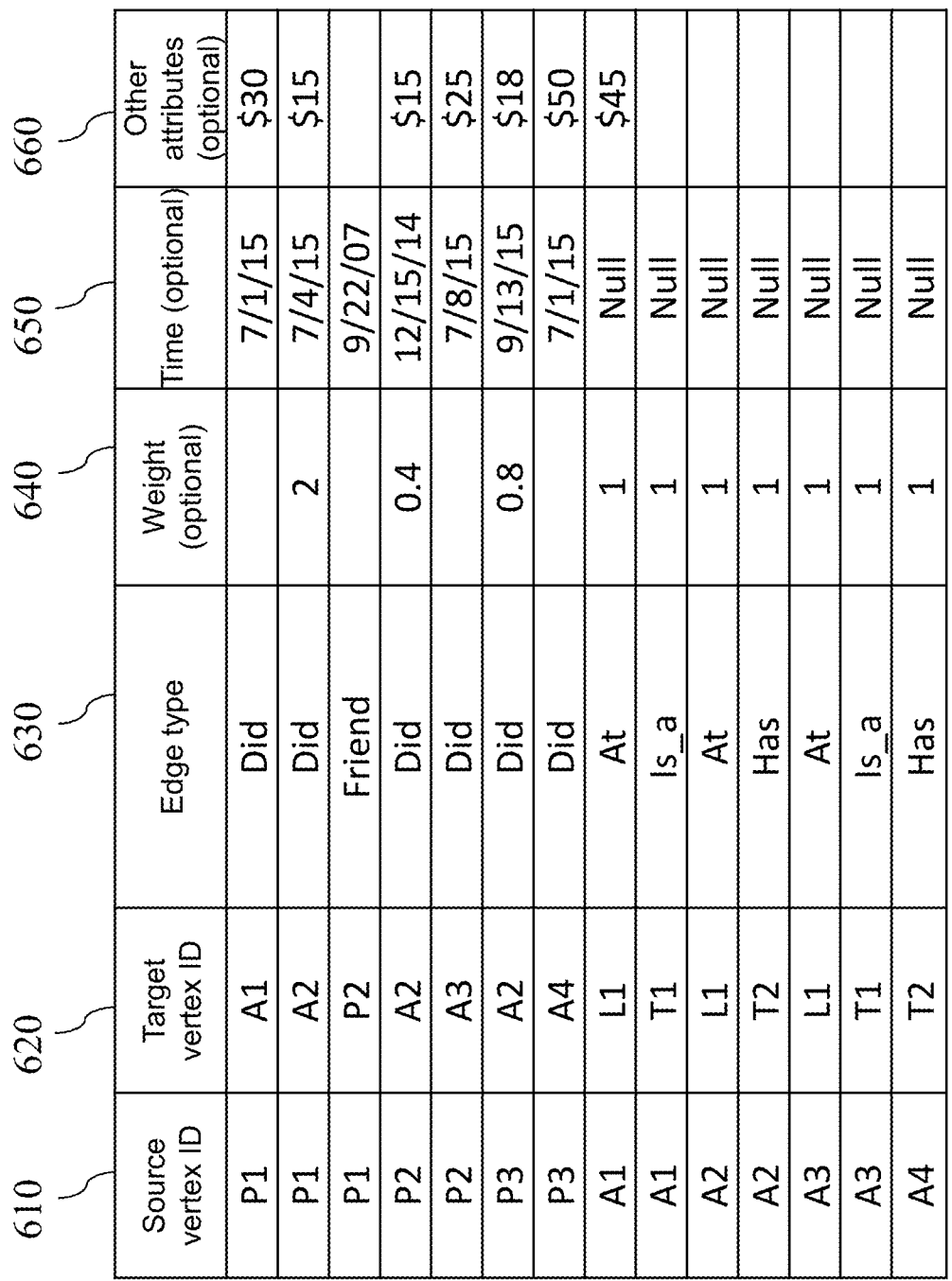
FIG. 6 is an exemplary diagram illustrating one embodiment of an edge table of the graph database of FIG. 1.

Turning now to FIG. 6, an Example Edge Table 600 is an example instance of the Edge Table 130. The Example Edge Table 600 includes a collection of individual edge records. Each edge record is shown to include a Source vertex ID 610, a Target vertex ID 620, an Edge type 630, and optional additional attributes 640-660. Edge type categories can be different than vertex type categories. The body of the Example Edge Table 600 corresponds to the edges for the exemplary relationship graph 200A of FIG. 2B. The vertex IDs in the Example Edge Table 600 match the vertex IDs in the Example Vertex Table 500. In the Example Edge Table 600, the optional attributes are Weight (optional) 640, Time (optional) 650—when the relationship was established, and price—within Other attributes (optional) 660. In some embodiments, an edge may have many additional attributes, and the kind of attributes may depend upon the type of edge. A selected subgraph processor 104 can use edge attributes to select or filter out edges for consideration or to determine the relative importance of an edge.

In an alternative embodiment, the graph data may be stored in a single Vertex Table 120 without an accompanying Edge Table 130. To encode the information about edges, each vertex record includes a list of neighbor vertices to which the current vertex has a connection. If an edge has additional attributes, such as a strength attribute, this attribute data can be stored in the neighbor-vertex list. This embodiment may store the data more compactly than an embodiment with separate Vertex Table 120 and Edge Table 130, if edges have few attributes beyond the identity of the source and target vertices.

The descriptions above of the recommendation system 100 having one Vertex Table 120 and possibly one Edge Table 130 refer to the logical structure of the data storage and not necessarily to the physical embodiment of the information. There may be multiple copies of the Vertex Table 120 and Edge Table 130, to advantageously provide greater parallelism and greater reliability. Moreover, the Vertex Table 120 and Edge Table 130 will typically be partitioned and spread across a plurality of Subgraph Processors 104.

The structure of Example Edge Table 600 includes a direction for each edge, from Source to Target, but the Recommendation System 100 permits a path to traverse an edge in either direction. To facilitate bidirectional traverse, in some embodiments, one relationship between two entities from the source data results in two edges in the Edge Table 130, listing one edge for each direction.

FIG. 7 shows a Double Edge Table 700. For every edge from A to B, there is also an edge from B to A. The Double Edge Table 700 has an additional column, Direction 710, to indicate an edge's direction. Some embodiments of the recommendation system 100 use the Double Edge Table 700 instead of the Example Edge Table 600. Some embodiments can generate the Double Edge Table 700 from the Example Edge Table 600 when a Control Vector 102 indicates the need for reserve direction traversal. In still other embodiments, the recommendation system 100 can traverse an edge in the reserve direction using the Example Edge Table 600 by treating the values in Target vertex ID 620 as the Source end of a reserve edge and Source vertex ID 610 as the Target of the reverse edge. These embodiments need only half the memory space for the edge tables. In the remainder of this disclosure, references to an Edge Table 130 include a Double Edge Table 700.

Figure 8:
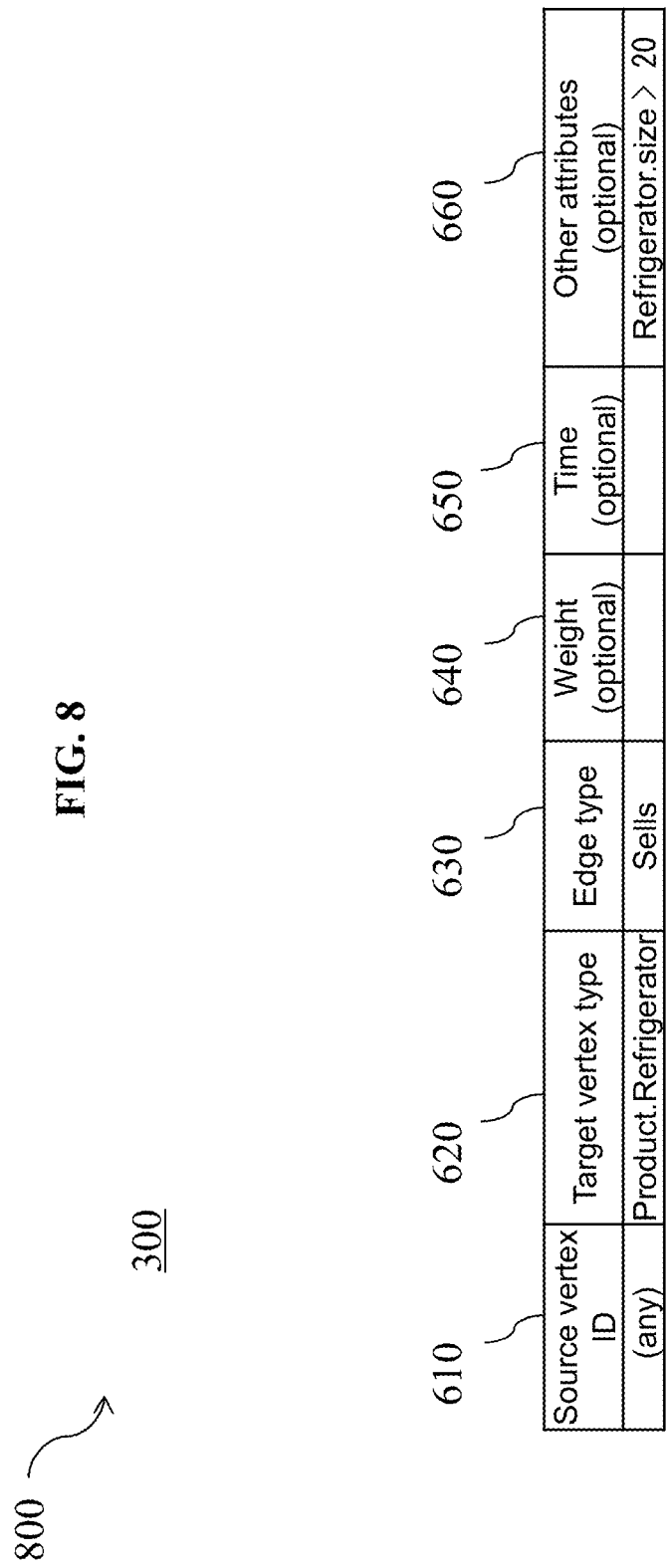
FIG. 8 is an exemplary block diagram illustrating another embodiment of an iteration control object of the control vector FIG. 3A.

Moving to FIG. 8, an ICO 800 is another embodiment of the ICO 300 shown in FIG. 3A, taking the form of a template edge. That is, ICO 800 is structured like one edge from the Example Edge Table 600, in which each field contains a description of the acceptable values. When processing this template edge, a Subgraph Processor 104 looks for edges that match the pattern of this template edge. The attribute values in ICO 800 are suitable for a search for a refrigerator larger than 20 cubic feet.

With respect to the pattern matching of the template edge, the ICO 800 has a value "Product.Refrigerator" for Target vertex type 620 and a value "sells" for Edge type 630, so only edges in the Example Edge Table 600 that describe the sale of a refrigerator are said to match. Further, the Other attributes 660 has value "Refrigerator.size>20", so only edges which describe the sale of refrigerators with sizes greater than twenty cubic feet are said to match.

Partitioned Storage and Processing of the Graph

The System Manager 101 may partition the Vertex Table 120 among a plurality of Subgraph Processors 104. In accordance with this vertex partitioning, the System Manager 101 also partitions the Edge Table 130, such that if a vertex V's data record resides in Subgraph Processor S, then any edge whose Source vertex is V also resides in Subgraph Processor S. If the Edge Table 130 uses Double Edge Table 700, then Subgraph Processor S will have both forward and reverse edges for V.

Having a greater number of Subgraph Processors 104 enables a higher degree of parallel processing, which may lead to faster throughput times. In some embodiments, there is only one Subgraph Processor 104. While this embodiment is expected to be slower than others, it is fully functional. In some embodiments, the System Manager 101 assigns some or all vertices to multiple Subgraph Processors 104, to provide redundancy and backup, guarding against processor failure or slow response.

Figure 9:
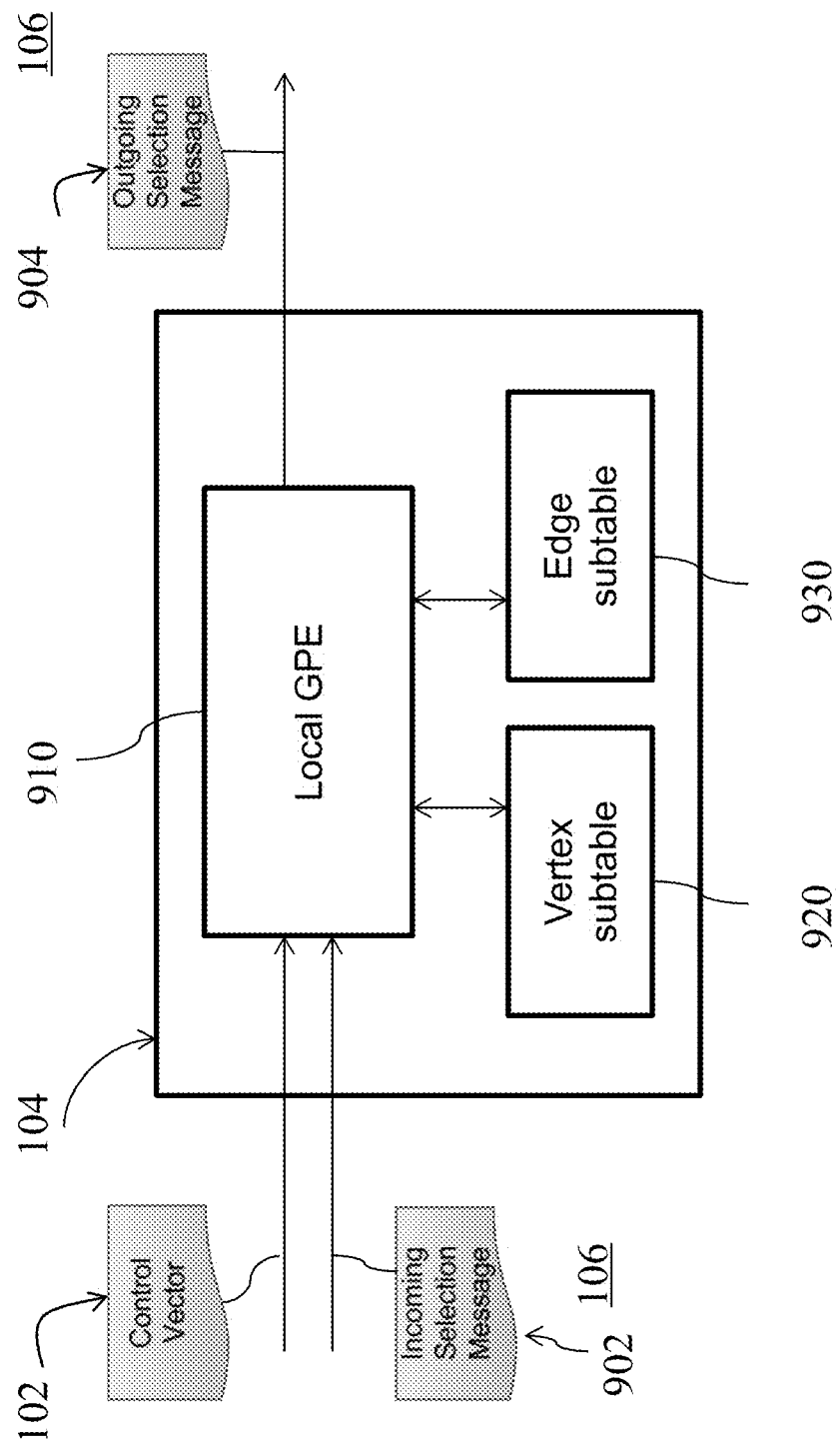
FIG. 9 is an exemplary block diagram illustrating one embodiment of a subgraph processor of the graph-based recommendation system of FIG. 1.

Referring to FIG. 9, each one of the Subgraph Processors 104 may have a Vertex subtable 920, an Edge subtable 930, and a Local Graph Processing Engine (Local GPE) 910. The Local GPE 910 is responsible for receiving a Control Vector 102 or an Incoming Selection Message 902, interpreting the Control Vector 102, and executing the actions described in the Control Vector 102. To execute the actions described in the Control Vector 102, the Subgraph Processor 104 searches the Vertex subtable 920 for Source vertices that satisfy the specifications in the Control Vector 102, refers to the Edge subtable 930 to see if the selected Source vertices connect to qualifying edges, and if so, identifies the qualified Target vertices at the other end of those edges. The Local GPE 910 then assembles a list of these qualified Target vertices and sends the list out in the Outgoing Selection Message 904.

The Vertex subtable 920 and the Edge subtable 930 are electronic data storage units, which may be persistent storage units, such as files or databases, or nonpersistent storage units, such dynamic arrays in RAM memory.

Selection Messages 106

In step 480, each one of the Subgraph Processors 104 sends a Selection Message 106 to inform other Subgraph Processors 104 about which vertices the one Subgraph Processor 104 selected as Recommendation path End vertices. Each recipient will check its allocation of vertices to see if the Selection Message 106 lists any vertices held in the recipient's local Vertex subtable 920.

In an alternative embodiment, Subgraph Processors 104 send Selection Messages 106 to the System Manager 101. The System Manager 101 then forwards the Selection Messages 106 to the Subgraph Processors 104. While this embodiment requires an additional step in the communication pattern, it has advantages. First, this embodiment may reduce the number of Selection Messages 106. If the recommendation system 100 employs point-to-point messaging, then N Subgraph Processors 104 each sending a message to all other Subgraph Processors 104 uses N*(N+1) messages. On the other hand, in the alternative embodiment, each one of the Subgraph Processors 104 sending one message to the System Manager 101 produces N messages. The System Manager 101 then sending N messages to inform all Subgraph Processors 104 produces another N messages, so there are a total of only 2N messages. Additionally, once the System Manager 101 has received all the messages, it has the opportunity to merge information from the individual messages.

Recommendation Messages

When the recommendation system 100 has processed an endpoint ICO 300 of the Control Vector 102 and thus has completed the last iteration, the End vertices of the several Subgraph Processors 104 represent the recommended items. A Recommendation Message 108 may contain the same information as a Selection Message 106. In some embodiments, they have identical formats.

Conceptually, the Selection Message 106 has a list of vertices, and the Recommendation Message 108 also has a list of vertices. In some embodiments, the format of the Recommendation Message 108 contains more information than just the identity of the Recommended vertices 204. For example, the Recommendation Message 108 may contain a numerical weight, representing the strength of the recommendation. As another enhancement, the Recommendation Message 108 may contain a list of all the vertices along the Recommendation path, to describe how the recommendation was constructed. The Selection Messages 106 may contain additional information similar to the additional information in Recommendation Messages 108.

Additional Details and Optional Features

Exclusion of Backtracking

In many recommendation scenarios, the Control Vector 102 will include back-to-back iterations that specify the same type of edges. For example, a search for recommendations of "Consumers who bought the same Products as the Seed Consumer" could have back-to-back edges of the Consumer-Product type. The first iteration goes from the Seed Consumer to its products. The second iteration goes from those products to other Consumers. This means that the second iteration would allow paths to move back to the Seed Consumer from which they started (because the Seed has bought the same products that he himself bought). Such backtracking paths are not useful. The recommendation system 100 can filter out such backtracking paths.

Figure 10:
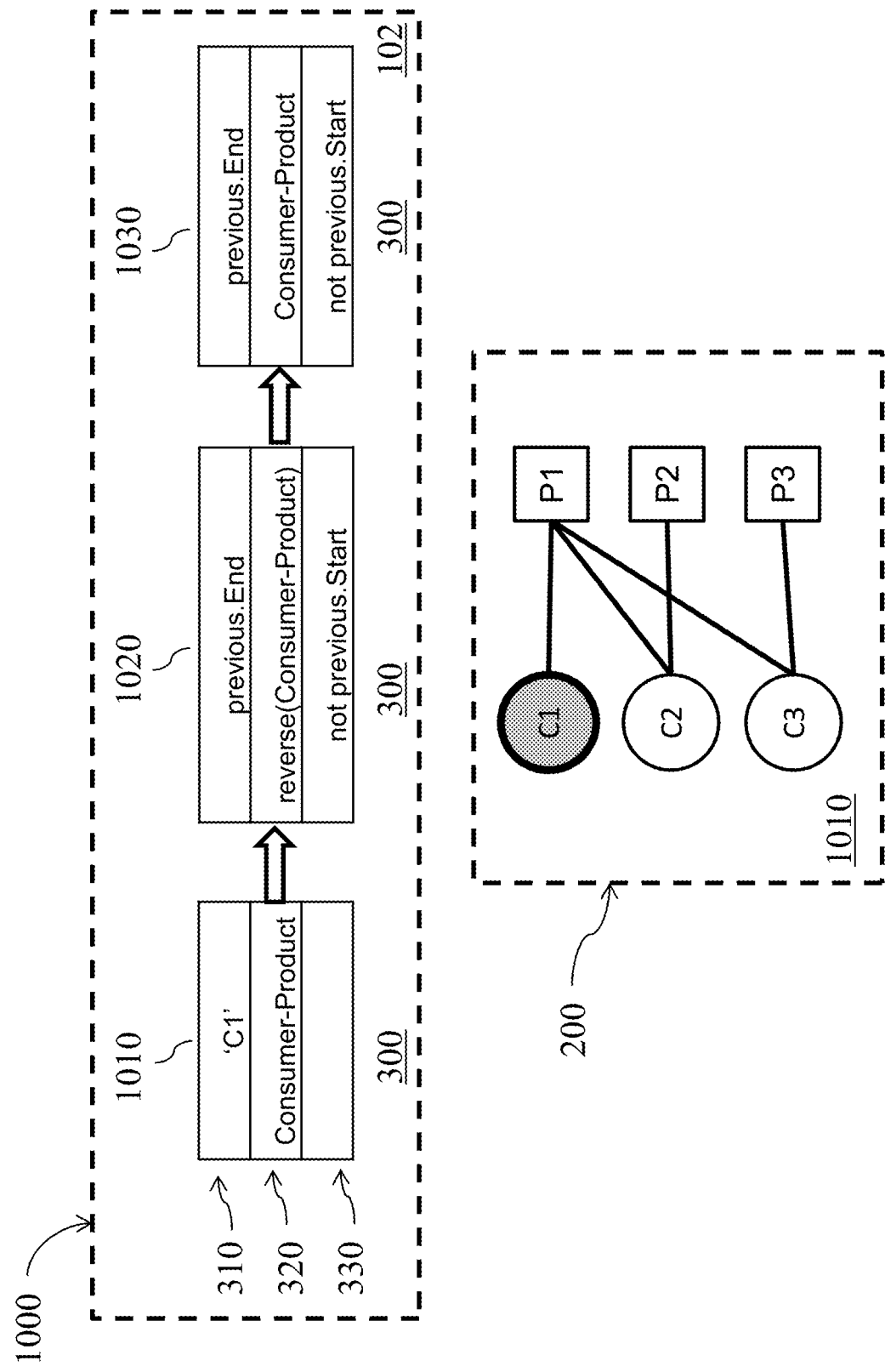
FIG. 10 is an exemplary block diagram illustrating an embodiment of the control vector of FIG. 3A for a recommendation request using the relationship graph of FIG. 2B.

For example, in FIG. 10, Control Vector 1000 is an example of a Control Vector 102 to implement the search for recommendations of "Other Consumers who bought the same Products as the Seed-Consumer C1". Both the first Iteration Control Object 1010 and the second Iteration Control Object 1020 specify an edge type of Consumer-Product, via their respective Relationship specifiers 320. Suppose the Control Vector 1000 is applied to the exemplary relationship graph 1010. The first iteration selects an edge from vertex C1 to P1. In the second iteration, the three edges [P1,C1], [P1,C2], and [P1,C3] all match the desired edge type, but the edge [P1,C1] backtracks to the Seed Consumer C1 and so does not represent a useful recommendation. The Target vertex specifier 330 of ICO 1020 states that the path should not return to its previous start vertex; that is, the path should not backtrack. Therefore, [P1,C1] is not selected in the second iteration. The third ICO 1030, like ICO 1010 and ICO 1020, also specifies a Consumer-Product edge. Here again, the Target vertex specifier 330, this time that of ICO 1030, states that the Recommendation path should not backtrack.

Filtering out backtracking paths requires that the recommendation system 100 maintain a memory of where each path has been. In some embodiments, the Selection Messages 106 contain the full Recommendation paths constructed so far. In this case, each Subgraph Processor 104 to checks, such as during step 460, if a potential End vertex would create a new path which returns to the vertex from which it just came. The Subgraph Processor 104 can then reject such End vertices.

In some embodiments, each Subgraph Processor 104 stores a list of its own vertices that were Start vertices in the previous iteration. The list is updated each iteration. Each Subgraph Processor 104 checks this internal list to see if a potential path extension would be returning to the vertex from which it just came. The Subgraph Processor can then reject such edges.

Weights and Scoring

The recommendation system 100 may assign numerical scores or weights to each path. Such scores can enable the recommendation system 100 to select the best recommendations—those with the highest scores. Each Subgraph Processor 104 assigns and update scores for each path that is processes. In some embodiments, the Subgraph Processors 104 examine these scores during each iteration and uses these scores to select better paths and to filter out lower scoring paths. After the final iteration, the System Manager 101 can use the scores to perform a final filtering.

There are numerous ways in which the data can contain weights and the Subgraph Processors 104 can compute scores. Several illustrative examples are provided below. These examples are not intended to be exhaustive.

Edge and Vertex Weights:

Each edge and vertex may have a weight. The weight values are stored in the optional fields in the Edge Table 120 and Vertex 130. A weight may represent any concept. For example, a weight on an edge may represent the strength or importance of the relationship. A weight on a vertex may represent the salience of this type.

Path Scores:

The system may compute a path score, based on the attributes of the edges and vertices along the path. The System Manager 101 may preprogram the Subgraph Processors 104 with a scoring function, or the scoring function may be contained may be contained within some part of the Control Vector 104. For example, each ICO 300 could contain a scoring function appropriate to the edge traversal described in that ICO 300. The function may consider not only the weight properties, but also any other properties of the edges and weights. For example, some edges make have a time-date property, so that more recent times may be assigned a higher score. As another example, either the preprogrammed score function or the Control Vector 102 may indicate that some edge types are more valuable than other edge types.

There are many possible ways that a path score can be computed from a collection of edge attribute values and vector attribute values. One scheme for computing a path score is to multiply the weight of the newly added edge to the score of the path that the new edge is extending.

Figure 11:
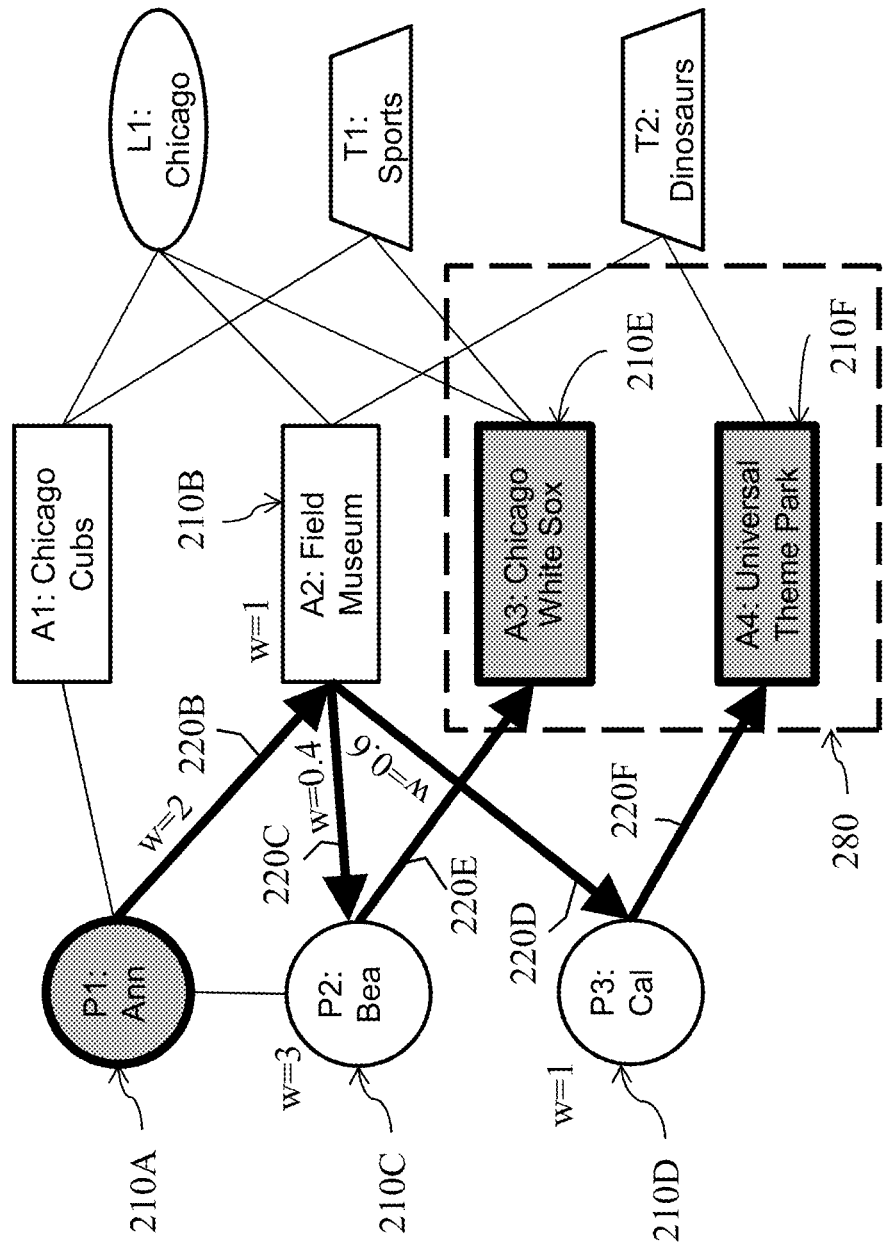
FIG. 11 is an exemplary diagram illustrating one embodiment of edge weights in a relationship graph used by the graph-based recommendation system of FIG. 1.

Turning to FIG. 11, an exemplary relationship graph 1100 includes the same set of vertices and edges as in the exemplary relationship graph 200A of FIG. 2B, except that weights have been added to selected edges and vertices. The notation for a path is represented by a sequence of vertices visited by the path. The scoring function for a path multiplies the weights of all edges along a path.

After the first iteration, the path [P1,A2] has a score of 2.
After the second iteration,
the path [P1,A2,P2] has a score of 2*0.4=0.8,
and the path [P1,A2,P3] has a score of 2*0.6=1.2.

As another example, consider the same graph with a different scoring function. The function is now to add together the product of each edge weight with its Target vertex weight. If the edges along a path are labeled (edge$_1$, edge$_2$, ..., edge$_k$), then score=$\Sigma_{i=1\ to\ k}$ weight(edge$_i$)×weight(target(edge$_i$)).

With this scoring function, after the second iteration,
the path [P1,A2,P2] has a score of 2*1+0.4*3=3.2
and the path [PLA2,P3] has a score of 2*1+0.6*1=2.6.

Path Aggregation

In some cases, multiple Recommendation paths will converge at the same vertex. In many applications, the desire may be to merge them into one compound path and to compute a single net score. For example, many recommendation requests are interesting in the similarity between pairs of vertices, as measured by how many neighboring vertices the two vertices have in common. The recommendation system 100 can compute this similarity score as follows:

Let V1 and V2 be the two vertices of interest. V1 is set as a Start vertex. The Iteration Control Object 300 instructs the Subgraph Processors 104 to select all suitable edges connected to V1, so the suitable neighbors of V1 become the End vertices of the first iteration. If there are N selected edges, then there are N paths. In the next iteration, the next Iteration Control Object 300 instructs the Subgraph Processors 104 to select the same type of edges. The neighbors of V1 are now Start vertices and look for neighbors of the same type as V1. Some of the N paths may converge on the same End vertex. If multiple paths have the same Start vertex and same End vertex, it is desirable to aggregate the paths to compute a single recommendation score for the combined paths. One way to compute an aggregate score for converging paths is to simply count the number of paths that arrive at the same vertex. If the paths have weights, then other ways are to use the sum, linear average, geometric average, highest weight, or lowest weight as the aggregate score, for example.

Figure 12:
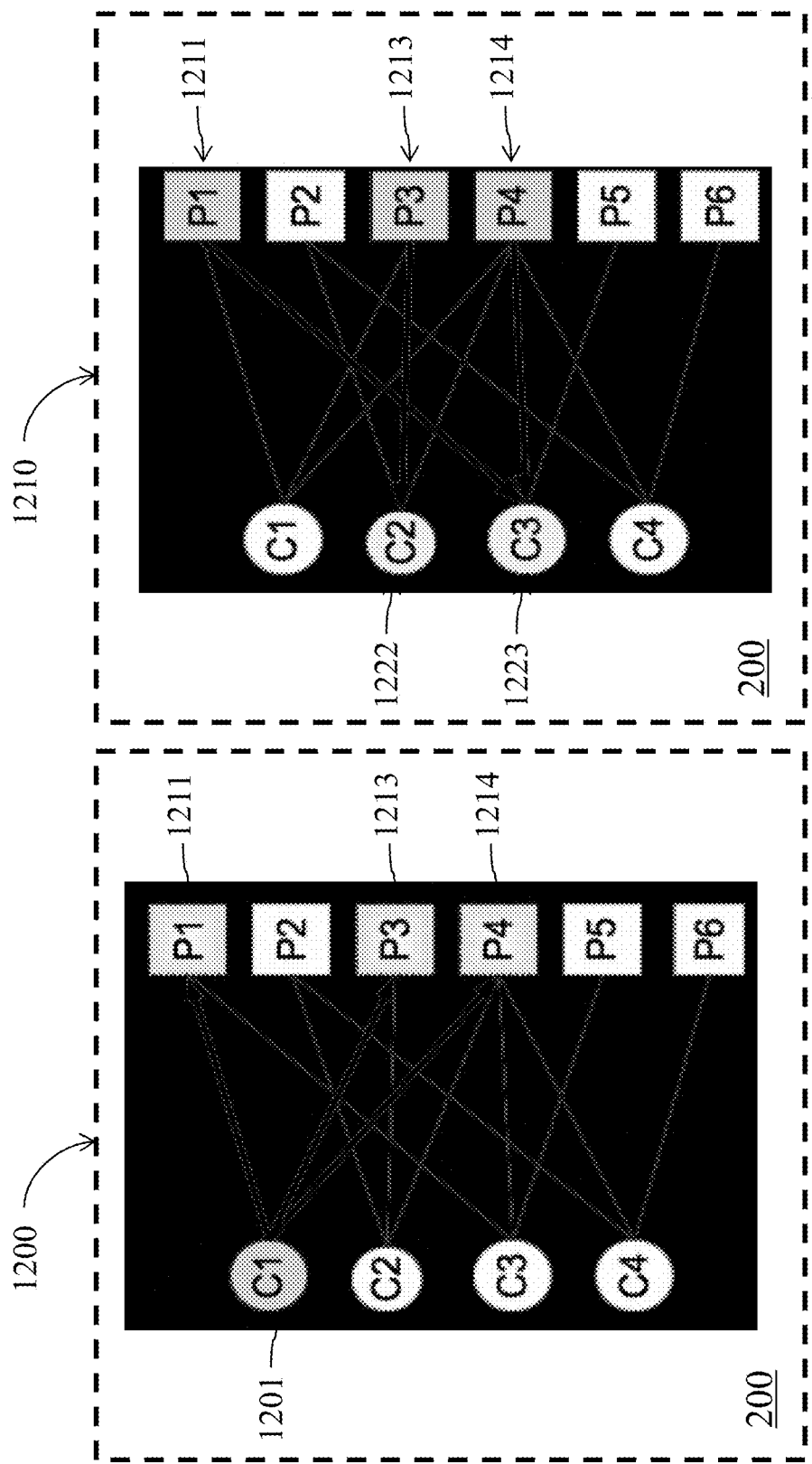
FIG. 12 is an exemplary diagram illustrating one embodiment of path aggregation in the real-time recommendation method of FIG. 4.

FIG. 12 illustrates an example of converging paths and score aggregation. An exemplary graph 1200 is shown as a graph highlighting the first iteration of the recommendation process 4000. The Control Vector 102 includes two segments for this recommendation request 103 and uses the first iteration to select all neighbors of the Start vertex and then uses the second iteration to select those neighbor's neighbor. Vertex 1201 (C1) is the Start vertex. Vertices 1211 (P1), 1213 (P3), and 1214 (P4) are the neighbors of vertex 1201 (C1) and thus are the End vertices of the first iteration. Graph 1210 is the same graph as Graph 1200 but with highlighting for the second iteration instead. In the second iteration, vertices 1222 (C2) and 1223 (C3) are the neighbors of vertices 1211 (P1), 1213 (P1), and 1214 (P4). Vertex 1223 (C3) is the End vertex of two paths, from vertices 1211 (P1) and 1214 (P4), so the two paths are merged and assigned a path score of 2. Vertex 1222 (C2) is the End vertex of only one path, so vertex 1222 (C2) has a path score of 1. If individual paths themselves have weights, the merging function can incorporate those weights as well.

Formulation of Control Vectors

The following are examples of several common recommendation requests 103 and how they may be formulated as a Control Vector 102.

In these examples, there are four types of vertices; User, Product, UserAttribute, and ProductAttribute. Control Vectors 102 are described in abbreviated form, as a series of labeled arrows from one vertex type to another vertex type. The edge label describes the type of relationship.

Example 1: Social Network (People that I Know)

User—(know)→User

Example 2: People Who have Bought Many of the Same Products that I Bought

User—(bought)→Product—(bought)→User

Example 3: People Who have Attributes Similar to Mine

User—(has)→UserAttribute—(has)→User

Example 4: Recommended Products Based on Similarity of Purchase History (Collaborative Filtering)

User—(bought)→Product—(bought)→User—(bought)→Product

Example 5: Recommended Products Based on Similarity of Products to Products

User—(bought)→Product—(has)→ProductAttributes—(has)→Product

Examples of Optional Specifiers in Control Vector

Below is a list of examples of Relationship specifiers 320 and End vertex specifiers 330 that may be used to specify a particular Control Vector 102 to refine the recommendation request 103.

start_vertices(list): A list of vertices to serve as Start vertices for the given iteration. The first ICO 300 of the Control Vector 102 specifies at least one Start vertex. However, later instances of ICO 300 may also describe Start vertices. When the recommendation process is under way, the list of Start vertices from the ICO 300 at Iteration N are combined with the vertices specified in the Incoming Selection Message 902 to become the effective set of Start vertices for Iteration N.

edge_types(list): A list of (type, weight) pairs that indicate the edge types which are eligible for selection on this iteration. The weight parameter is used to adjust the relative importance of each edge type when computing an aggregate path score.

Start_time/End_time(time): The earliest and latest time values, respectively, for eligible edges.

Time_decay(list): A list of parameters which describe a decay factor to be multiplied with edge weights so that effective weights decrease over time.

vertex_weights(list): A list of (type, weight) pairs that indicate the relative weight for each type of vertex that may be encountered in a Recommendation path. The weight parameter is used to adjust the relative importance of each vertex when computing an aggregate path score.

score_type(code): A keyword whose value could be "sum" (default), "count," or "average" (sum/count). The keyword tells the Subgraph Processors 104 which of several possible scoring functions to use.

is_evidence: If this iteration is labeled as evidence, then the identifiers of all the selected vertices will be recorded and passed along in all subsequent Selection Messages 106. The final Recommendation Messages 108 will thus contain a record of vertices that were used in this iteration (and whose paths survived to the end).

expand_start_by(list): A list of N edge types. The start vertices explicitly listed in this iteration's ICO 300 will be expanded by traversing the given sequence of N edge types to the N-neighborhood set.

expand_result_by(list): A list of N edge types. The end vertices found by this iteration will be expanded by traversing the given sequence of N edge types to the N-neighborhood set. Note that this is applied at the end of this iteration, but has an impact on the implicit start vertices on the following iteration, or on the final Recommendation Message 108 if this is the final iteration.

filters: There are a variety of optional filters that impact the final result. All of them are applied in different ways to exclude a vertex from that iteration's output.

limit(k): k is an integer. After ranking results by vertex value (score), output only the first k items.

sample_from(n): n is an integer, used in conjunction with limit. If this value is greater than the limit, then randomly sample the results from a set of size n. For example, if sample_from=50 and limit=10 then determine the top 50 recommended items, and then randomly choose 10 of them be in the iteration's output set.

start_date/end_date(time): exclude any vertices outside of this date range.

not-connected(list): a set of vertices that should be excluded from the result. Basically, any vertex that is connected to one of the start vertices via one of the given edge types will be flagged for exclusion.

require_connected(list): inverse of not-connected: any vertex that is NOT connected to one of the start vertices via one of the given edge types will be flagged for exclusion.

content(list): list of regular expression strings that will be matched against the default 'content' attribute on a result vertex. The content string must match ALL regular expressions, or in other words if ONE fails, then the result is not included.

skip-hubs(k): any end vertices with degree greater than the number k will be excluded.

sample-hubs(n, k): if a start vertex has a degree greater than n, then only k of its outgoing neighbors, randomly selected, will be used.

promote_results(list): In general, results are only sorted if this iteration is the final iteration or if there is a limit on an intermediate iteration. In these cases, a vertex will be promoted to the top of the rank if the vertex itself, or one item from the evidence collected for recommending this vertex is in the set "promote_results".

Option: Path-Recording Recommendations

In some recommendation applications, the requester would like to know the justification for the chosen recommended items. That is, the requester wishes to know some of the data that were used to arrive at the final recommendations. To support this need, in some embodiments, the system may record a subset of the selected vertices, edges, and weights. In some embodiments, the notification of what to record is part of the Control Vector 102. Each Iteration Control Object 300 may specify whether its output selections are to be recorded or not, and what filters to apply.

One way to record and transmit this information is to carry it within the Selection Messages 106. In this embodiment, when a Subgraph Processor 104 receives an incoming Selection Message 106, the Selection Message 106 contains the information gathered from previous iterations. The Subgraph Processor 104 constructs its Outgoing Selection Message 904 such that the Outgoing Selection Message 904 contains path information from Incoming Selection Message 902, as well as additional information.

In one case, every Iteration Control Object 300 includes full path information in Outgoing Selection Message 904. As a result, the recommendation system 100 records every selected path, building and extending the paths iteratively.

Using the paths in FIG. 11 as an example,

The first iteration's Selection Message 106 contains the path [P1,A2].

The second iteration's Selection Messages 106 contains two paths:

[P1,A2,P2], [P1,A2,P3]

The third iteration's Selection Messages 106 contains two paths:

[P1,A2,P2,A3], [P1,A2,P3,A4]

The final iteration is the third iteration; the final paths are included in the Recommendation Messages 108. The first path can be interpreted as saying, "A3 was recommended because P2 did A3 and because P2 also did the same activity A2 that you (P1) did."

Option: Multithreaded Operation

In some embodiments, the recommendation system 100 supports multithreaded recommendation processing. That is, the recommendation system 100 may be processing more than one Control Vector 102 at a time. Each Control Vector 102 initiates a recommendation process 4000. Multithreaded processing is advantageous when there is a large volume of requests on a large graph, but each request is expected to involve only a small subset of the graph. Each Control Vector 102 may have a unique process ID value. In the event that two or more recommendation processes 4000 cross paths, that is, two or more recommendation processes 4000 arrive on the same vertices and possibly traverse the same edges, the process ID values keep the activity separable.

Option: Connecting Related Vertices

Figure 13:
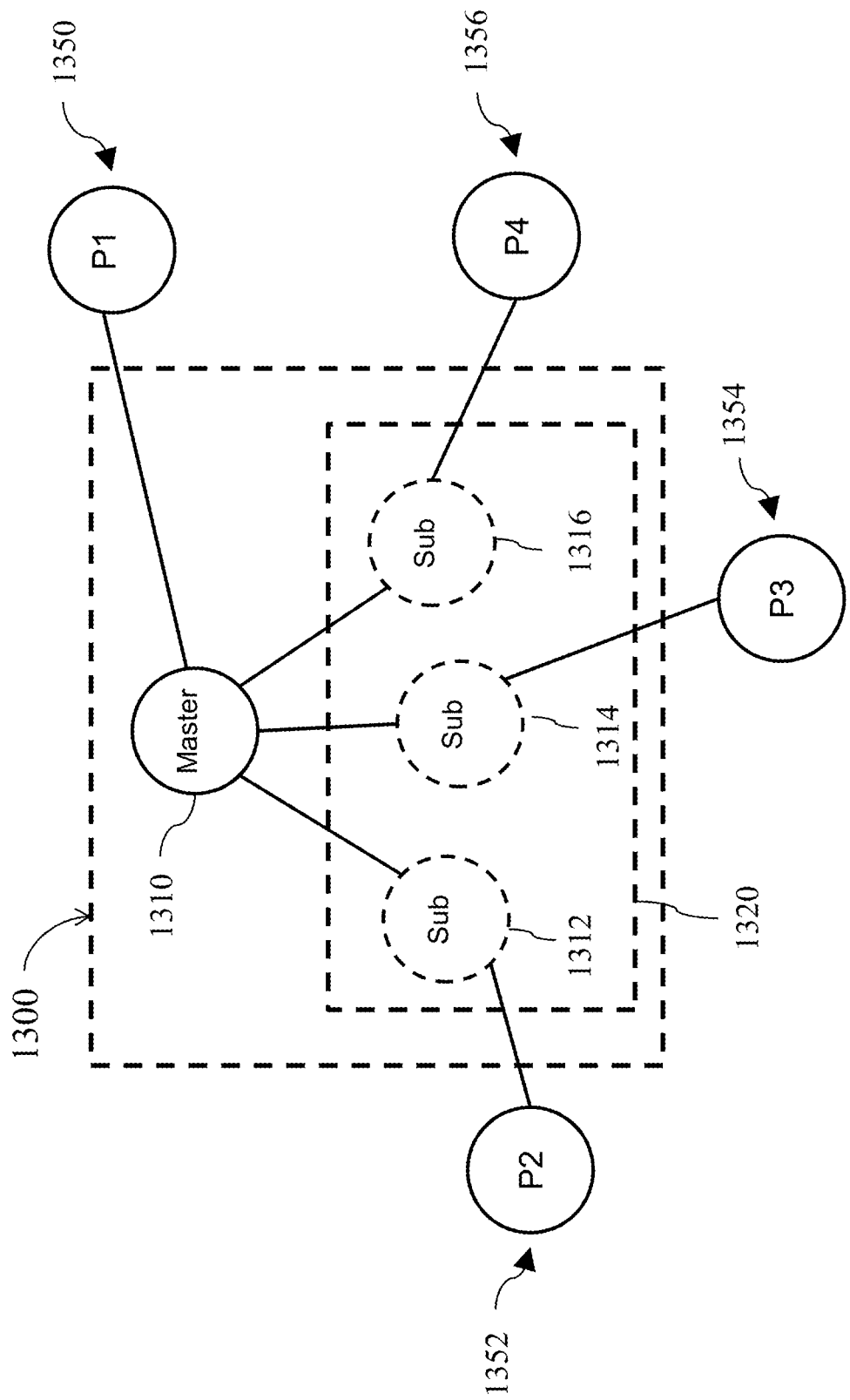
FIG. 13 is an exemplary diagram illustrating one embodiment of master vertices and subordinate vertices in the relationship graph of FIG. 2B.

In some applications, there are vertices that may be considered part of a close family of vertices. For example, in some applications a user may have a Master account, which may in turn have multiple subaccounts. Turning to FIG. 13, a vertex family 1300 contains a Master vertex 1310, which represents a Master account, and a subvertex set 1320. As an example, the subvertex set 1320 contains three subvertices 1312, 1314, and 1316, which are subaccounts of the Master account. As another example, the Master vertex 1310 could represent one principal product, such as a mobile phone, with the subvertices 1312, 1314, and 1316 representing different versions of the product (e.g., different colors, different amounts of flash memory). The different versions of the product are represented as distinct vertices, but a particular recommendation request 103 may wish to treat the subvertices as one unit, like merging the vertex family 1300 into one vertex. This merging can be used to take a global view of all the network connections from the vertex family 1300. For example, when merged, the vertex family 1300 has four neighbors, vertices 1350, 1352, 1354, and 1356, instead of each member of the vertex family 1300 having one neighbor each.

However, to perform the merging by altering the graph structure is a costly operation. Instead of altering the relationship graph 200, the recommendation system 100 can simulate the merging by automatically traversing from one member of the vertex family 1300 to another. The recommendation system 100 can achieve this traversal by using the expand_start_by or expand_result_by options mentioned above in the ICO 300, and specifying the edge type that joins subvertices to the Master vertex 1300. For example, suppose a graph has instances of the Master vertex 1310 which connect to subvertices, which are User type vertices. At an iteration in the Control Vector 102 when User type vertices are the target type, the Control Vector 102 may invoke the expand_result_by(subuser-to-masteruser, masteruser-to-subuser) option. This option instructions the Subgraph Processor 104 to proceed from the original result vertices, traversing onward from subusers to masterusers and then back to subusers, if appropriate. Using FIG. 13 as an example, suppose that the subvertex 1312 is selected as an End vertex of the Nth ICO 300 of the Control Vector 102. If the expand_result_by(subuser-to-masteruser, masteruser-to-subuser) option is present in the Control Vector 102, then the Subgraph Processor 104 will automatically move from the subvertex 1312 to the other members of vertex family 1300. Therefore, all four vertices of vertex family 1300 will be included as End vertices of the Nth ICO 300.

Option: Nonlinear Control Structures

The preceding examples have described and illustrated the Control Vector 102 as a linear vector for illustration purposes only. However, in some embodiments, the structure of the Control Vector 102 can be nonlinear, such as that of a Directed Acyclic Graph (DAG) or a Finite State Machine (FSM). More complex forms advantageously provide more complex recommendation schemes.

Turning to FIG. 14, an exemplary DAG control structure 1410 is an example of the Control Vector 102 in the form of a DAG. When the DAG control structure 1410 branches outward (e.g., an ICO 1401 points to both an ICO 1402 and an ICO 1403), the functional behavior is analogous to that of multithreaded operation. To handle the branching connections between the ICOs 300 in the DAG control structure 1410, some embodiments modify the recommendation process 4000. For example, in the step 430 of the first iteration, the selected Subgraph Processor 104 selects and begins the processing of the ICO 1401. The ICO 1401 leads to both the ICO 1402 and the ICO 1403. Therefore, both the ICO 1402 and the ICO 1403 can be processed in the second iteration. The recommendation system 100 can process multiple simultaneous ICOs 300 by assigning them to separate Subgraph Processors 104. In some instances, simultaneously executed ICOs 300 can potentially lead to race conditions. In some embodiments, the DAG control structure 1410 is serialized, so that there is no simultaneity of the ICOs 300. Either the ICO 1402 completes before the ICO 1403 starts, or the ICO 4003 completes before the ICO 1403 starts. In some embodiments, a DAG control structure 1410 applies the same or similar protection scheme used in multithreaded operation to avoid race conditions.

Another issue arises when paths merge, such as at the start of the ICO 1405, located at the merge point. Assuming that branches are permitted to run in parallel, then the ICO 1403 completes at the end of the second iteration, while the ICO 1404 does not complete until the end of the third iteration. In some embodiments, to address the different schedules of the different paths, the ICO 1405 will not begin operating until it has received Selection Messages 106 from all incoming ICOs 300, that is, from both the ICO 1403 and the ICO 1404.

FIG. 14 also shows an exemplary FSM control structure 1420, an example of the Control Vector 102 in the form of an FSM. As an FSM, each of the ICOs 300 of the exemplary control structure 1420 represents a State, and the States are not restricted to having a linear (unidirectional) relationship. For example, one State may lead back to an earlier State, such as an ICO 1407 leading to an ICO 1408, and then the ICO 1408 having the option to lead back to the ICO 1407. It is also possible for the recommendation system 100 to remain in the same state for more than one iteration cycle. To support FSM functionality, the Iteration Control Objects 300 can contain additional information, describing the conditions for when to proceed to what other state. Such additional information may take the form of a state transition table.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method for providing a recommendation to a request based on a graph having one or more edges each connecting a source vertex and an endpoint vertex, comprising:

providing a control vector to one or more subgraph processors, the control vector defines a set of relationship edges and target vertices for each of the source vertices in response to the request;

identifying a current set of source vertices from the provided control vector via the subgraph processors;

traversing the identified current set of source vertices to a current set of endpoint vertices based on the set of relationship edges and the target vertices of the control vector for the current set of source vertices via the subgraph processors;

selecting any of the endpoint vertices as recommended vertices that satisfy the provided control vector via the subgraph processors;

iteratively repeating said identifying, traversing, and selecting, wherein the current set of endpoint vertices becomes the current set of source vertices for each subsequent iteration of said identifying, and each subsequent iteration of said identifying, traversing, and selecting occurring only when all of the subgraph processors have completed a current iteration; and returning the selected endpoint vertices representing the recommendation to the request, wherein said providing the control vector comprises providing one or more iteration control objects each defining one or more selected source vertices and one or more edges that can be traversed from each selected source vertex.

2. The method of claim 1, wherein each of the iteration control objects further defines a set of restricted target vertices that limit the one or more edges and the endpoint vertices that can be traversed from each selected source vertex.

3. The method of claim 1, wherein said providing the iteration control objects further comprises defining the one or more edges that can be traversed as a set of conditional statements.

4. The method of claim 1, further comprising assigning a score to each of the relationship edges and target vertices, and wherein said selecting is further based on the assigned scores.

5. The method of claim 1, further comprising translating the request into the control vector.

6. The method of claim 5, wherein said translating maps at least one portion of the request into a vertex type, a vertex, an edge type, or an edge.

7. The method of claim 1, wherein said providing the control vector includes providing a Directed Acyclic Graph or a Finite State Machine.

8. A method for providing a control vector to a graph-based recommendation system in response to a request, the graph having one or more edges, each of the one or more edges connecting a source vertex and an endpoint vertex, the method comprising:
  defining a set of relationship edges and target vertices for each of the source vertices in response to the request, the set of relationship edges providing at least one graph traversal path of the graph;
  identifying a set of source vertices as seed vertices based on the defined set of relationship edges and target vertices for each of the source vertices;
  generating one or more iteration control objects each defining one or more selected source vertices and one or more edges that can be traversed from each selected source vertex;
  providing the defined set of relationship edges and the identified seed vertices to one or more subgraph processors of the graph-based recommendation system; and
  iteratively traversing the graph via the subgraph processors based on the provided defined set of relationship edges and the identified seed vertices to define a set of recommended vertices, each subsequent iteration occurring only when all of the subgraph processors have completed a current iteration, wherein said one or more subgraph processors performs said identifying for each subsequent iteration.

9. The method of claim 8, wherein each iteration control object further defines a set of restricted end vertices that limit the one or more edges that can be traversed from each of the selected source vertices.

10. The method of claim 8, wherein said providing the iteration control objects further comprises defining the one or more edges that can be traversed as a set of conditional statements.

11. The method of claim 8, wherein said providing the defined set of relationship edges and the identified seed vertices includes providing a Directed Acyclic Graph or a Finite State Machine.

12. A system for providing a recommendation to a request based on a graph having one or more edges, each of the one or more edges connecting a source vertex and an endpoint vertex, the system comprising:
  one or more subgraph processors for traversing the graph; and
  a system manager for providing a control vector to said subgraph processors, the control vector defining a set of relationship edges and target vertices for each of the source vertices in response to the request,
  wherein each subgraph processor iteratively identifies a current set of source vertices from the provided control vector; traverses the identified current set of source vertices to a current set of endpoint vertices based on the set of relationship edges and the target vertices of the control vector for the current set of source vertices, selects any of the endpoint vertices as recommended vertices that satisfy the provided control vector, wherein the current set of endpoint vertices becomes the current set of source vertices for each subsequent iteration and returns the selected endpoint vertices representing the recommendation to the request, wherein said system manager provides the control vector as one or more iteration control objects each defining one or more selected source vertices and one or more edges that can be traversed from each selected source vertex, and each subsequent iteration of identifying, traversing, and selecting via the subgraph processors occurring only when all of the subgraph processors have completed a current iteration.

13. The system of claim 12, wherein each iteration control object further defines a set of restricted target vertices that limit the one or more edges and the endpoint vertices that can be traversed from each selected source vertex.

14. The system of claim 12, wherein each subgraph processor further assigns a weight to each of the relationship edge and target vertices to limit the one or more edges that can be traversed from each selected source vertex.

15. The system of claim 12, further comprising a translation module for translating the request into the control vector.

16. The system of claim 15, wherein the translation module maps at least one portion of the request into a vertex type, a vertex, an edge type, or an edge.

17. The system of claim 12, wherein said system manager provides the control vector as a Directed Acyclic Graph or a Finite State Machine.

* * * * *